US009319951B2

(12) United States Patent
Hole

(10) Patent No.: US 9,319,951 B2
(45) Date of Patent: Apr. 19, 2016

(54) CHECKING ACCESS TO CLOSED SUBSCRIBER GROUP CELLS IN A MOBILE NETWORK

(75) Inventor: David Philip Hole, Southampton (GB)

(73) Assignee: BlackBerry Limited, Waterloo, Ontario (CA)

(*) Notice: Subject to any disclaimer, the term of this patent is extended or adjusted under 35 U.S.C. 154(b) by 1004 days.

(21) Appl. No.: 13/467,743

(22) Filed: May 9, 2012

(65) Prior Publication Data

US 2013/0273887 A1 Oct. 17, 2013

Related U.S. Application Data

(60) Provisional application No. 61/623,977, filed on Apr. 13, 2012.

(51) Int. Cl.
H04W 40/00 (2009.01)
H04W 36/08 (2009.01)
H04W 84/04 (2009.01)

(52) U.S. Cl.
CPC ............ *H04W 36/08* (2013.01); *H04W 84/045* (2013.01)

(58) Field of Classification Search
CPC .............................. H04W 48/16; H04W 24/08
USPC ......................................................... 455/446
See application file for complete search history.

(56) References Cited

U.S. PATENT DOCUMENTS

2013/0003697 A1* 1/2013 Adjakple .......... H04W 36/0011 370/331
2013/0208644 A1* 8/2013 Jung ....................... H04W 4/08 370/312

FOREIGN PATENT DOCUMENTS

GB 2489291 9/2012

OTHER PUBLICATIONS

International Searching Authority, "International Preliminary Report on Patentability", issued in connection with International Application No. PCT/EP2013/057846, mailed Oct. 23, 2014 (12 pages).
"3rd Generation Partnership Project; Technical Specification Group Core Network and Terminals; Mobile Radio Interface Layer 3 Specification; Core Network Protocols; Stage 3 (Release 10)," 3GPP TS 24.008 V10.6.1, Mar. 2012 (648 pages).
"3rd Generation Partnership Project; Technical Specification Group Radio Access Network; Requirements for Support of Radio Resource Management (FDD) (Release 10)," 3GPP TS 25.133 V10.5.0, Mar. 2012 (268 pages).

(Continued)

*Primary Examiner* — Omoniyi Obayanju
(74) *Attorney, Agent, or Firm* — Fish & Richardson P.C.

(57) ABSTRACT

Example disclosed mobile station methods comprise performing a first access check based on a first equivalent public land mobile network (EPLMN) list and a first registered public land mobile network (RPLMN) identifier to determine whether a mobile station is allowed to access a closed subscriber group (CSG) cell, performing a second access check based on a second EPLMN list and a second RPLMN identifier, and conditioning reporting of the CSG cell based on the first and second checks. Example disclosed network methods comprise receiving a message from a packet switched domain network node indicating whether a mobile station is allowed to access a CSG cell, and if the message indicates that the mobile station is not allowed to access the CSG cell, informing a circuit switched domain network node that a DTM handover failure has occurred.

11 Claims, 13 Drawing Sheets

(56) References Cited

OTHER PUBLICATIONS

"3rd Generation Partnership Project; Technical Specification Group GSM/EDGE Radio Access Network; Mobile Radio Interface Layer 3 Specification; Radio Resource Control (RRC) Protocol (Release 9)," 3GPP TS 44.018 V9.11.0, Dec. 2011 (432 pages).

"3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.6.0, Mar. 2012 (442 pages).

"3rd Generation Partnership Project; Technical Specification Group GSM/EDGE Radio Access Network; General Packet Radio Service (GPRS); Mobile Station (MS)—Base Station System (BSS) Interface; Radio Link Control / Medium Access Control (RLC/MAC) Protocol (Release 10)," 3GPP TS 44.060 V10.8.0, Mar. 2012 (623 pages).

"3rd Generation Partnership Project; Technical Specification Group GSM/EDGE Radio Access Network; Mobile Switching Centre—Base Station System (MSC—BSS) Interface; Layer 3 Specification (Release 10)," 3GPP TS 48.008 V10.5.0, Mar. 2012 (224 pages).

"3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 10)," 3GPP TS 48.018 V10.5.0, Mar. 2012 (184 pages).

Patent Cooperation Treaty, "International Search Report," issued in connection with International Patent Application No. PCT/EP2013/057846, on Oct. 23, 2013 (7 pages).

Patent Cooperation Treaty, "Written Opinion of the International Searching Authority," issued in connection with International Patent Application No. PCT/EP2013/057846, on Oct. 23, 2013 (10 pages).

Renesas Mobile Europe Ltd, "Equivalent PLMN List and CSG Reporting in Dedicated and DTM Mode," 3GPP TSF CT WG1 Meeting #76, C1-120469, Xiamen (P.R. China), Feb. 6-10, 2012 (6 pages).

Renesas Mobile Europe Ltd, "Equivalent PLMN List and CSG Reporting in Dedicated mode," 3GPP TSG GERAN#52, GP-111698, Bratislava, Slovakia, Agenda Item 7.2.5.1.2, Nov. 21-25, 2011 (7 pages).

\* cited by examiner

CHECKING ACCESS TO CLOSED SUBSCRIBER GROUP CELLS IN A MOBILE NETWORK

RELATED APPLICATION(S)

This patent claims priority from U.S. Provisional Application Ser. No. 61/623,977, entitled "ACCESS CHECK FOR CSG CELLS AFTER INTER-PLMN HANDOVER" and filed on Apr. 13, 2012. U.S. Provisional Application Ser. No. 61/623,977 is hereby incorporated by reference in its entirety.

FIELD OF THE DISCLOSURE

This disclosure relates generally to mobile network and, more particularly, to checking access to closed subscriber group cells in a mobile network.

BACKGROUND

In Universal Mobile Telecommunication System (UMTS) and Long Term Evolution (LTE) mobile networks, access to certain cells can be restricted to particular groups of users. Such a group of users is referred to as a close subscriber group (CSG). A particular cell in which access is restricted to a CSG, such as a femtocell served by a home Node-B (HNB) in a UMTS network or a home enhanced Node-B (HeNB) in an LTE network, is referred to as a CSG cell. When performing a handover to a CSG cell, a mobile station (also referred to herein as user equipment or a UE) performs an access check involving a CSG whitelist and public land mobile network (PLMN) identification information available at the mobile station to determine whether it is allowed to access the CSG cell. Network elements, or nodes, in the mobile network's core network also perform one or more access checks involving the CSG whitelist and available PLMN identification information to determine whether the mobile station is allowed to access the CSG cell. In general, the mobile station is not permitted to handover to the CSG cell unless all such access checks indicate that the mobile station is allowed to access the CSG cell.

BRIEF DESCRIPTION OF THE DRAWINGS

Wherever possible, the same reference numbers will be used throughout the drawing(s) and accompanying written description to refer to the same or like elements.

DETAILED DESCRIPTION

Figure 1:
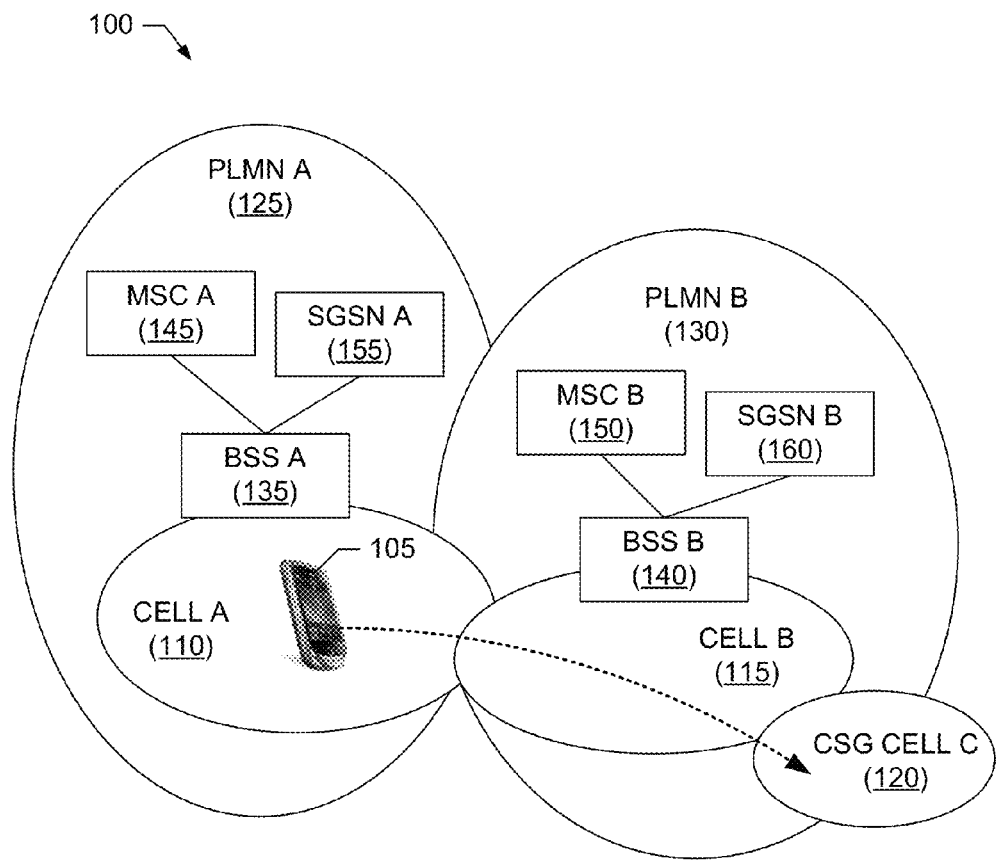
FIG. 1 is block diagram of an example mobile network in which access to closed subscriber group (CSG) cells can be checked in accordance with the examples disclosed herein.

Example methods, apparatus and articles of manufacture (e.g., storage media) for checking access to closed subscriber group (CSG) cells in a mobile network are disclosed herein. Disclosed example methods for a mobile station to check access to CSG cells include performing a first access check based on a first equivalent public land mobile network (EPLMN) list (e.g., which may be null or, in other words, empty) and a first registered public land mobile network (RPLMN) identifier to determine whether the mobile station (e.g., such as a mobile station operating in a dual transfer mode (DTM)) is allowed to access a CSG cell. The example methods also include performing a second access check based on a second EPLMN list (e.g., which may be null or, in other words, empty) and a second RPLMN identifier to determine whether the mobile station is allowed to access the CSG cell. The example methods further include conditioning reporting of the CSG cell (e.g., via a measurement report) based on the first access check and the second access check.

In some examples, the first EPLMN list and the first RPLMN identifier respectively include an EPLMN list and an RPLMN identifier obtained via a most recent packet switched domain registration procedure. For example, the packet switched domain registration procedure can include a routing area update procedure. In such examples, the first access check includes comparing a public land mobile network (PLMN) identifier associated with the CSG cell with the first EPLMN list and the first RPLMN identifier.

In some examples, the second EPLMN list and the second RPLMN identifier respectively comprise an EPLMN list and an RPLMN identifier obtained via a most recent circuit switched domain registration procedure. For example, the circuit switched domain registration procedure can include a location update procedure. In such examples, the second access check includes comparing a PLMN identifier associated with the CSG cell with the second EPLMN list and the second RPLMN identifier. Some of these example methods further include storing the second EPLMN list and the second RPLMN identifier before obtaining the first EPLMN list and the first RPLMN identifier via a subsequent packet switched domain registration procedure.

In some example methods, conditioning the reporting of the CSG cell based on the first access check and the second access check includes reporting the CSG cell if at least one of the first access check indicates that the mobile station is allowed to access the CSG cell or the second access check indicates that the mobile station is allowed to access the CSG cell, but not reporting the CSG cell if the first access check indicates that the mobile station is not allowed to access the CSG cell and the second access check indicates that the mobile station is not allowed to access the CSG cell. In some of these example methods, information is sent to the network to identify which of the first access check and the second access check indicated that the mobile station is allowed to access the CSG cell. In other example methods, conditioning the reporting of the CSG cell based on the first access check and the second access check includes reporting the CSG cell if the first access check indicates that the mobile station is allowed to access the CSG cell and the second access check indicates that the mobile station is allowed to access the CSG cell, but not reporting the CSG cell if at least one of the first access check indicates that the mobile station is not allowed to access the CSG cell or the second access check indicates that the mobile station is not allowed to access the CSG cell.

Disclosed example methods for a mobile network to check access to CSG cells include receiving a message from a packet switched domain network node indicating whether a mobile station is allowed to access a target CSG cell. The example methods further include, if the message indicates that the mobile station is not allowed to access the target CSG cell, informing a circuit switched domain network node that a DTM handover failure has occurred. Some example methods further include, if the message indicates that the mobile station is allowed to access the target CSG cell, permitting the DTM handover to the target CSG cell to proceed.

In some examples, the message is received at a base station subsystem (BSS) serving the mobile station. In some examples, the packet switched domain network node includes a serving general packet radio service (GPRS) support node (SGSN). In some examples, the circuit switched domain network node includes a mobile switching center (MSC).

In some examples, the received message indicates a result of the packet switched domain network node checking whether the mobile station is allowed to access the target CSG cell. In some examples, the received message includes a cause value indicating that the CSG cell is invalid if the mobile station is not allowed to access the target CSG cell, and inclusion of the cause value indicating that the CSG cell is invalid takes precedence over inclusion of another valid cause value. In some such examples, the message indicates that the mobile station is allowed to access the target CSG cell if the cause value indicating that the CSG cell is invalid is not included in the message. In other examples, the received message includes a first cause value indicating that the CSG cell is invalid if the mobile station is not allowed to access the target CSG cell, and a second cause value indicating another valid cause value. In some such examples, the message indicates that the mobile station is allowed to access the target CSG cell if the first cause value indicating that the CSG cell is invalid is not included in the message.

In some examples, the received message is a first message, and informing the circuit switched domain network node that the DTM handover failure has occurred includes sending a second message to the circuit switched domain network node indicating that an access control failure has occurred. In some examples, the received message is a first message, and the methods further include receiving a second message from the circuit switched domain network node indicating that the mobile station is allowed to access the target CSG cell, waiting for the first message, and not permitting the DTM handover to the target CSG cell to proceed if the first message indicates that the mobile station is not allowed to access the target CSG cell.

As described in greater detail below, the foregoing example methods, as well as the further example methods, apparatus and articles of manufacture disclosed herein, can be used for checking access to CSG cells in mobile networks. An example of such a mobile network 100 in which access to CSG cells can be checked in accordance with the examples disclosed herein is illustrated in FIG. 1. The mobile network 100 of the illustrated example includes an example mobile device 105 (also referred to as example user equipment (UE) 105) located in a coverage area including examples cells 110, 115 and 120 (also labeled as cells A, B and C, respectively, in FIG. 1). In the illustrated example, cell C (120) is a CSG cell, cell A (110) is a macro cell associated with a first public land mobile network (PLMN), and cell B (115) is a macro cell associated with a second PLMN. The first PLMN and the second PLMN may be associated with the same or different network operators, service providers, etc. Furthermore, although two macro cells 110/115 and one CSG cell 120 are shown in the example of FIG. 1, the mobile network 100 can support any number of macro cells and/or CSG cells.

To provide radio access network (RAN) functionality, the mobile network 100 of the illustrated example includes example base station subsystems (BSSs) 135 and 140 (also labeled as BSS A and B, respectively, in FIG. 1). As shown in FIG. 1, BSS A (135) supports cell A (110), and BSS B (140) supports cell B (115). To provide core network (CN) functionality, the mobile network 100 of the illustrated example further includes example mobile switching centers (MSCs) 145 and 150 (also labeled as MSC A and B, respectively, in FIG. 1), and example serving general packet radio service (GPRS) support nodes (SGSNs) 155 and 160 (also labeled as SGSN A and B, respectively, in FIG. 1). As shown in FIG. 1, MSC A (145) and SGSN A (155) are associated with PLMN A (125), with MSC A (145) providing circuit switched (CS) domain CN functionality for BSS A (135) and SGSN A (155)

providing packet switched (PS) domain CN functionality for BSS A (135). Similarly, MSC B (150) and SGSN B (160) are associated with PLMN B (130), with MSC B (150) providing CS domain CN functionality for BSS B (140) and SGSN B (160) providing PS domain CN functionality for BSS B (140). In the illustrated example, the BSSs 135/140, the MSCs 145/150 and the SGSNs 155/160 are implemented to be compliant (except where such compliance conflicts with the examples disclosed herein) with Third Generation Partnership Project (3GPP) specifications, such as 3GPP global system for mobile communications (GSM), general packet radio service (GPRS), enhanced GPRS (EGPRS), enhanced data rates for GSM evolution (EDGE), UMTS and/or LTE specifications, etc. Furthermore, although two BSSs 135/140, two MSCs 145/150 and two SGSNs 155/160 are shown in the example of FIG. 1, the mobile network can support any number of BSSs, MSCs and/or SGSNs.

The mobile station 105 of FIG. 1 can be implemented by any type of mobile station or user endpoint equipment, such as a smartphone, a mobile telephone device that is portable, a mobile telephone device implementing a stationary telephone, a personal digital assistant (PDA), etc., or, for example, any other type of mobile device. Furthermore, although one mobile station 105 is illustrated in FIG. 1, the example mobile network 100 can support any number and/or type(s) of mobile stations 105.

As mentioned above, cell C (120) in the mobile network 100 of FIG. 1 is a CSG cell. To perform a handover to CSG cell C (120), the mobile station 105 performs an access check to determine whether the mobile station 105 is allowed to access the CSG cell C (120). Depending on the type of handover being performed (e.g., such as a CS domain handover, a PS domain handover or a dual transfer mode (DTM) handover), one or both of the MSC B (150) and/or the SGSN B (160) also perform an access check to determine whether the mobile station 105 is allowed to access the CSG cell C (120). In general, the mobile station 105 is not permitted to handover to CSG cell C (120) unless the CSG access check performed by the mobile station 105 and the CSG access check(s) perform by the CN (e.g., performed by the MSC 150 and/or SGSN 160) all indicate that the mobile station 105 is allowed to access the CSG cell. As described in greater detail below, in prior 3GPP-compliant second generation (2G) networks (e.g., GSM networks, GPRS networks, etc.), third generation (3G) networks (e.g., UMTS networks) and fourth (4G) networks (e.g., LTE networks, E-UTRAN networks, etc., where E-UTRAN means evolved UMTS radio access network), the mobile station CSG access check and the CN access check(s) may use different information to perform their respective checks and, thus, may yield inconsistent results. Such inconsistent CSG access check results can cause unnecessary exchange of handover-related communications (such as when the mobile station's access check passes, but a CN access check fails), resulting in wasted bandwidth, wasted power consumption, etc. In contrast, the mobile station 105, the BSSs 135/140, the MSCs 145/150 and/or the SGSNs 155/160 individually and/or collectively implement one or more example approaches disclosed above and in greater detail below for checking access to CSG cells (e.g., the CSG cell 120) in the mobile network 100 that can reduce or eliminate the possibility of the mobile station access check and the CN access check(s) yielding inconsistent results.

To provide context for the example approaches disclosed herein for checking access to CSG cells (e.g., the CSG cell 120) in the mobile network 100, consider the following information concerning CSG cells, CSG access checking and DTM in 3GPP-compliant networks. In 3GPP-compliant mobile networks, CSG cells are provided by a home Node-B (HNB) or a home enhanced Node-B (HeNB). CSG cells restrict access to particular groups of users, referred to as CSG groups. A CSG cell, such as the CSG cell 120, is a cell that (1) indicates that it is a CSG cell (e.g., by way of a bit broadcast in the cell's system information) and (2) broadcasts a CSG identifier (ID) (e.g., also in the cell's system information). A cell can indicate none or one CSG ID, although multiple cells may share a CSG ID. A UE, such as the mobile station 105, may be subscribed to one or more CSGs, and such subscriptions may be temporary (e.g. such as when a coffee shop allows a customer a one hour access to its CSG) or (semi)permanent.

Generally, to access communication services provided by a CSG cell, a UE must be granted restricted access to a CSG to which the subject CSG cell belongs. A CSG whitelist identifies CSGs to which the UE is granted restricted access. A CSG is identified by a CSG ID and an associated PLMN ID (because CSG IDs are local to or, in other words, guaranteed to be unique only within a particular PLMN). Accordingly, the CSG whitelist may be considered as a list of <CSG ID, PLMN ID> tuples, with each <CSG ID, PLMN ID> tuple identifying a CSG to which the UE is granted access. In some examples (e.g., for coding/storage efficiency), the CSG whitelist may be represented as <PLMN ID, CSG ID#1[, CSG ID#2, ... ]> where multiple CSG IDs are permitted in a given PLMN.

In some examples, a UE's CSG whitelist may include two different lists, such as an operator list and a user list. In such examples, any <CSG ID, PLMN ID> tuple on one or both of the lists can be considered to be within the CSG whitelist of the UE.

Network elements (such as MSCs 145/150 and the SGSNs 155/160 of the mobile network 100) are also expected to store copies of the whitelist for the UEs registered to them. Using these CSG whitelists, the network elements can validate handover requests and, thus, ensure that a UE is not handed over to a CSG cell that it is not allowed to access. These whitelists may be transferred from the home subscriber server (HSS) of each UE to the network elements performing CSG access checking.

DTM is a mode of operation in, for example, 3GPP 2G networks (e.g., GSM/GPRS/EDGE networks) in which a UE, such as the mobile station 105, has both a CS connection (such as a voice call) and a PS connection (such as a temporary block flow (TBF)) active simultaneously. Similar dual modes of operation, in which a UE has a CS connection and a PS connection active simultaneously, exist in other networks, such as in UTRAN networks. Accordingly, the term DTM is used generally herein to mean an operating scenario in which a CS connection and a PS connection are active simultaneously and, thus, involves CS domain and PS domain synchronization in the core network, unless otherwise specified. In some networks, such as the mobile network 100, it is possible to perform a DTM handover in which both CS and PS resources are reserved for the UE in a target cell prior to the cell change, such that service interruption to both CS and PS services is minimized As such, a DTM handover usually includes a CS handover procedure (via one or more of MSCs) and a PS handover procedure (via one or more SGSNs) performed in parallel and coordinated by the serving (or source) BSS and the target BSS, which may be the same or different BSSs. In some examples, when a DTM handover is being performed, the MSC performing the CS handover procedure may be unaware that the CS handover being performed is part of the DTM handover. In other words, the MSC may perform the CS handover portion of the DTM handover as if it was a CS-only handover. Similarly, when a DTM handover is being performed, the SGSN performing the PS handover procedure may be unaware that the PS handover being performed is part of the DTM handover. In other words, the SGSN may perform the PS handover portion of the DTM handover as if it was a PS-only handover.

In some examples, when a mobile network, such as the mobile network 100, is performing a DTM handover involving a CS service and a PS service, the network may treat the ongoing CS service (e.g., likely to be voice) as having higher importance to the user than the ongoing PS service. This is because the user may tolerate service interruption to the PS service better than interruption to the CS service. In such examples, a network node, such as a BSS, serving a UE undergoing a DTM handover may choose to proceed with a CS-only handover if it is not possible to proceed with the PS handover portions of the DTM handover. The PS handover may not be possible because, for example, there are no PS resources available in the target cell, either the serving or target cell BSS (or both) does not support DTM handover, a timeout has occurred while waiting for a response from the PS domain, etc.

As part of the handover process to a CSG cell, some mobile networks, such as the mobile network 100, expect a UE, such as the mobile station 105, to check that it has permission to access the target CSG cell. In some examples, the UE performs this CSG access check by comparing one or more parameters, such as, but not limited to, the CSG ID broadcast by the CSG cell, with the entries in its local CSG whitelist. By performing a CSG access check, the UE will not send a measurement report (which may consume a significant amount of measurement reporting bandwidth and initiate handover procedures unnecessarily) or similar message to the network for a target CSG cell that the UE is not permitted to access. Furthermore, the BSS (or Node-B and radio network controller (RNC), or eNB, etc.) serving the UE is not aware of the CSG cells that the UE is and is not permitted to access. Therefore, the BSS is unable to restrict the initiation of handovers to only those CSG cells which the UE can access unless the UE performs a CSG access check as part of the handover process.

For example, 3GPP Technical Specification (TS) 25.133 (v10.6.0) specifies that a UE is to check that a target CSG cell is a CSG member cell, which means that the UE is able to access that CSG cell, before providing a measurement report for the target CSG cell (and, thus, initiating a handover to the target CSG cell). According to TS 25.133, for a UE that is in a radio resource control (RRC) connected state, a CSG member cell for a UE is a cell broadcasting an identity of the registered PLMN (RPLMN) or equivalent PLMN (EPLMN) for the UE and for which a CSG whitelist of the UE includes an entry containing the cell's CSG ID and the respective PLMN identity.

As another example, 3GPP TS 44.018 (v9.11.0) specifies that a mobile station supporting multiple radio access technologies (RATs) and operating in dedicated mode or DTM may report a CSG cell (e.g., as a precursor to performing a handover) if, among other things, the mobile station has determined that it is allowed to access the CSG cell. According to 3GPP TS 44.018, the UE can access a CSG cell if the CSG ID and the PLMN ID of the CSG cell matches one of the CSG IDs stored (with their associated PLMN IDs) in the UE's CSG whitelist (as defined in 3GPP TS 23.122), and the PLMN ID of the CSG cell matches the PLMN ID received during a most recent registration or registration update with the CS domain or that of an equivalent PLMN. In other words, because the CSG ID for a CSG cell is specific to a particular PLMN, the preceding examples involve a UE performing a complete access check in which the CSG ID broadcast by the CSG cell must match a CSG ID in the UE's whitelist, and the PLMN ID stored in the whitelist tuple for that CSG cell must also match the RPLMN or an EPLMN associated with the UE, for the UE to be able to access the target CSG cell. The RPLMN and the EPLMN list associated with the UE corresponds to the most recent RPLMN and the EPLMN list received from the network, regardless of whether the information was received from the CS domain or the PS domain. RPLMNs and EPLMNs are discussed in greater detail below.

As noted above, in some mobile networks, the CN node(s) involved in a handover will also perform CSG access check(s) when a handover of a UE to a target CSG cell is being attempted. For example, in prior 3GPP-compliant networks, as part of the PS handover procedure, the serving (source) SGSN will check whether the UE is permitted to access the target CSG cell. Similarly, in prior 3GPP-compliant networks, as part of the CS handover procedure, the serving (source) MSC will check whether the UE is permitted to access the target CSG cell. In the case of DTM handover, prior 3GPP-compliant networks require both the SGSN involved in the PS handover and the MSC involved in the CS handover to check whether the UE is permitted to access the target cell.

As noted above, because the CSG ID for a CSG cell is specific to a particular PLMN, a CSG access check performed by either a UE or a CN node (e.g., an SGSN and/or an MSC) may involve comparing the PLMN ID for the CSG cell with the RPLMN and any EPLMNs associated with the UE. A UE, such as the mobile station 105, has, at any given time, a single registered RPLMN or no RPLMN. The RPLMN for a UE is the PLMN on which the UE has performed a most recent non-access stratum (NAS) registration procedure A UE with an RPLMN may also have a list of EPLMNs provided by the network and with which the UE is also considered to be associated. The RPLMN and EPLMN list are updated (or confirmed) as part of a successful PS domain or CS domain registration procedure, such as a routing area update procedure in the PS domain or a location update procedure in the CS domain.

However, in 3GPP-compliant mobile networks, such as the mobile network 100, no CS-domain registration procedure is possible during an ongoing CS service (e.g., such as voice call). As a result, after a CS handover or a DTM handover, no location update procedure will occur as the location update procedure is in the CS domain, even if the UE has changed location areas. (This is due to the concept of an anchor MSC and the principle specified in 3GPP TS 24.008 that, when a mobility management (MM) connection exists, no MM specific procedure can be initiated.) Conversely, PS-domain registration procedures, such as a routing area update procedure, can occur during an ongoing PS connection.

The foregoing behavior means that, after a CS-only handover, the RPLMN and EPLMN list in the UE will remain unchanged regardless of the PLMN of the new cell (because no CS-domain registration procedure can be performed during the CS-only handover). When the CS connection terminates, the appropriate registration procedure (e.g., a location update procedure) can be performed, causing the RPLMN and EPLMN list to be updated appropriately. However, after a DTM or PS-only handover, the RPLMN and EPLMN list can be updated by a PS-domain routing area update procedure shortly after the cell change, even if the PS connection is still ongoing. As a result, after a DTM handover, the UE's new RPLMN and EPLMN list will be known to the UE and the SGSN involved in the PS-domain handover, whereas the UE's new RPLMN and EPLMN list may not be known to the MSC involved in the CS-domain handover (because a location update procedure cannot be performed until after the CS connection terminates). This problem of different CN nodes (e.g., an SGSN vs. an MSC) having different knowledge of the UE's RPLMN and EPLMN list can propagate with subsequent UE handovers. Also, the CN nodes (e.g., the SGSNs and MSCs) are to pass the UE's whitelist to the new serving CN nodes after each handover to permit subsequent CSG whitelist checking during subsequent handover procedures.

Accordingly, in prior 3GPP-compliant mobile networks, problems can arise when performing CSG access checks in the UE and in the CN nodes (e.g., the MSC and SGSN) for handover to a target CSG cell after a prior handover has occurred. These problems arise due to at least the following two aspects of CSG access checking in prior 3GPP-compliant systems. First, after a DTM handover in which both the CS session and the PS session are ongoing, the UE and target (or new) SGSN will have the same knowledge of the RPLMN/EPLMN list after the handover (e.g., due to a routing area update that can occur while PS session is ongoing). However, the target (or new) MSC will not have knowledge of the RPLMN/EPLMN list (e.g., because no CS-domain registration procedure can be performed while the CS session is ongoing). A similar problem can arise after a CS-only handover if a PS session is established after the handover without terminating the CS connection. Second, a 3GPP-compliant UE in DTM does not know whether any handover attempt will be for a CS-only handover or for a DTM handover as the type of handover is controlled by the network. If the UE was to use different CSG access checking procedures depending on whether the UE is involved in a CS-only handover or a DTM handover, the UE may select the wrong type of access check if the UE assumes it is in a DTM handover, but the network actually performs a CS-only handover, or vice versa.

Figure 2:
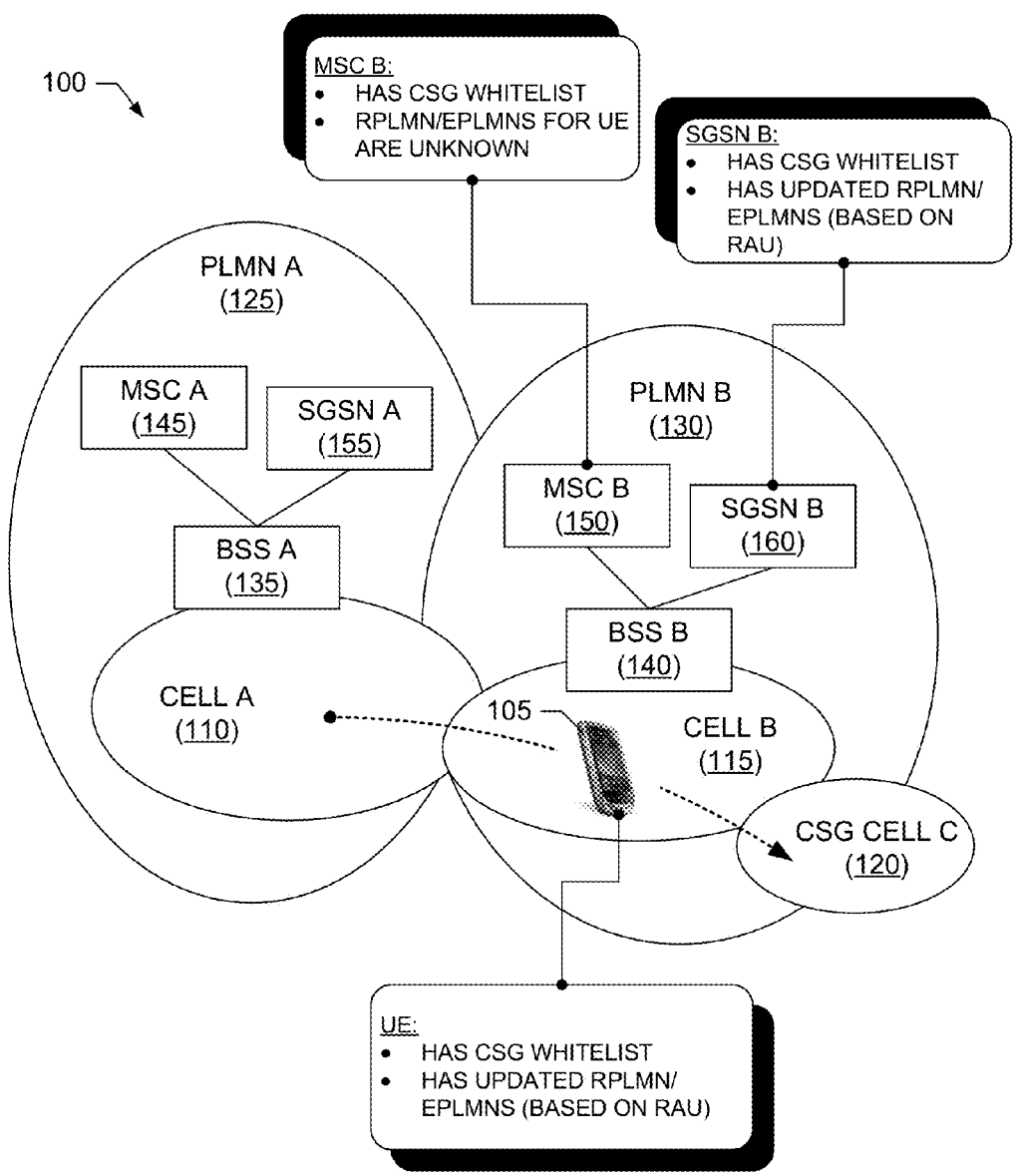
FIG. 2 is a block diagram illustrating an example handover operation in which access to a CSG cell is to be checked.

FIG. 2 depicts an example operating scenarios for the mobile network 100 of FIG. 1, which illustrate examples of the problem in which MSC B (150) and SGSN B (160) have different knowledge concerning the RPLMN and EPLMN list of the mobile station 105 when the mobile station 105 is determining whether to report CSG cell C (120) following an inter-PLMN DTM handover from cell A (110) to cell B (115) (e.g., which may cause a handover to be initiated by the network 100). In the illustrated example of FIG. 2, the foregoing problem can occur regardless of whether cell A (110) and cell B (115) are 2G (e.g., GERAN) cells or 3G (e.g., UTRAN) cells (where GERAN means GSM/EDGE radio access network). As described in greater detail below, the example approaches disclosed herein for checking access to CSG cells in the mobile network 100 endeavor to enable access checking with respect to a CSG cell, such as the CSG cell 120, under the assumption that CN nodes (e.g., MSC B (150) and SGSN B (160)) will also validate the access check performed by the mobile station 120. Furthermore, in view of the example scenario of FIG. 2, the example approaches disclosed herein for checking access to CSG cells in the mobile network 100 attempt to avoid situations in which, for example, the mobile station 105 detects CSG cell C (120), performs an access check and determines that access is allowed, but a CN node (e.g., MSC B (150) or SGSN B (160)) subsequently determines that the CSG access check fails. Such a situation can result in wasted effort (e.g., battery consumption, time, etc.) on the part of the mobile station 105 in evaluating the CSG cell 120 (which may also cause a temporary loss of service while the mobile station 105 acquires broadcast system information from the CSG cell 120) and also in sending the measurement report (which may be larger than the measurement report for a non-CSG cell and, as such, consume further wasted bandwidth).

To further motivate the example approaches disclosed herein for checking access to CSG cells in the mobile network 100, consider the following possible consequences that may occur when prior CSG access checking rules are used in the example of FIG. 2. In a first example scenario illustrated by FIG. 2, assume the CSG whitelist for the mobile station 105 includes the tuple <PLMN C, CSG ID 77> for CSG cell C (120), where "77" is the CSG ID of the cell 120. Furthermore, assume that CSG cell C (120) indicates (e.g., via broadcast information) that it is in PLMN C (not shown). In this example scenario, the mobile station 105 begins in cell A (110), and its RPLMN is PLMN A, whereas its EPLMN list is empty. Next, the mobile station 105 enters DTM and completes a DTM handover to cell B (115), which is in PLMN B. After the handover, but before any routing area update is performed, the RPLMN of the mobile station 105 is still PLMN A. Also, the CSG whitelist of the mobile station 105 is passed in the CN to MSC B (150) and SGSN B (160). Then, when the mobile station performs a routing area update (e.g., which is permitted although the PS session is still active), the RPLMN for the UE becomes PLMN B and assume that the EPLMN list provided in the update includes PLMN C. At this point in the scenario, which is depicted in the FIG. 2, SGSN B (160) knows the RPLMN and EPLMN list for the mobile station 105, whereas MSC B (150) does not (e.g., because a location update procedure cannot be performed in the CS domain while the CS session is still active).

Continuing with the example scenario, the mobile station 105 next detects CSG cell C (120) and performs a CSG access check to determine whether: (i) the CSG cell's PLMN and CSG ID are in the whitelist; and (ii) that the CSG cell's PLMN ID corresponds to the mobile station's RPLMN or is in the mobile station's EPLMN list. In the illustrated example, both portions of the CSG access check pass and, thus, the mobile station 105 sends a measurement report for the CSG cell 120 to the BSS 140.

In response to receiving the measurement report, the BSS 140 initiates a DTM handover to the CSG cell 120 for the mobile station 105. This causes MSC B (150) to perform a CSG check to determine whether: (i) the CSG cell's PLMN and CSG ID are in the CSG whitelist of the mobile station 105; and (ii) whether the CSG cell's PLMN ID corresponds to the mobile station's RPLMN or is in the mobile station's EPLMN list. In the illustrated example, the first portion of the CSG access check passes because MSC B (150) received the mobile station's CSG whitelist from MSC A (145) due to the DTM handover. However, in the illustrated example scenario, MSC B (150) does not know the mobile station's EPLMN list (which contains PLMN C, which is the PLMN of the CSG cell 120) and, therefore, the second portion of the CSG access check performed by MSC B (150) fails.

At substantially the same time, SGSN B (160) also performs a CSG access check to determine whether: (i) the CSG cell's PLMN and CSG ID are in the CSG whitelist of the mobile station 105; and (ii) whether the CSG cell's PLMN ID corresponds to the mobile station's RPLMN or is in the mobile station's EPLMN list. In the illustrated example, the first portion of the CSG access check passes because SGSN B (160) received the mobile station's CSG whitelist from SGSN A (155) due to the DTM handover. Furthermore, unlike the check performed by MSC B (150), the second portion of the access check performed by SGSN B (160) also passes because, due to the routing area update, SGSN B (160) knows the mobile station's EPLMN list (which contains PLMN C, which is the PLMN of the CSG cell 120). However, when prior CSG access checking rules are used, although the SGSN's access check passes, the DTM handover to CSG cell C (120) fails because the CS portion of the handover failed due to the MSC's access check having failed.

A second example scenario which may occur in the example of FIG. 2 also illustrates possible consequences that may occur when prior CSG access checking rules are used in mobile networks. In the second example scenario illustrated by FIG. 2, assume that the mobile station 105 initially is operating in CS-only mode or in DTM mode in cell A (110). Next, a CS-only handover is performed across routing area boundaries (of which PLMN boundaries are a subset) from cell A (110) to cell B (115). Then, after the CS-only handover, and without terminating the ongoing CS session (e.g., voice call), the mobile station 105 enters DTM in cell B (115). The mobile station 105 then performs a routing area update in cell B (115) (e.g., due to the change in routing area), but no location update procedure is performed in cell 115 (because the CS session is still active). At this point in the second scenario, the MSC B (150) and the SGSN B (160) have different knowledge of the mobile station's RPLMN and EPLMN list and, like for the first example scenario above, during a potential DTM handover to CSG cell C (120), the SGSN's CSG access check would pass, whereas the MSC's CSG access check would fail. Accordingly, when prior CSG access checking rules are used, the DTM handover to CSG cell C (120) would fail although the CSG access check performed by the SGSN B (160) passed.

A third example scenario which may occur in the example of FIG. 2 further illustrates possible consequences that may occur when prior CSG access checking rules are used in mobile networks. In the third example scenario illustrated by FIG. 2, assume that, when the mobile station 105 begins in cell A (110), its RPLMN is PLMN A and its EPLMN list contains PLMN C. The mobile station 105 then enters CS connected mode and completes a CS-only handover to cell B (115) in PLMN B Immediately after the handover, the mobile station's RPLMN is still PLMN A. Also, the mobile station's CSG whitelist is passed to MSC B (150), but MSC B (150) does not yet know the RPLMN or the EPLMN list of the mobile station 105 (e.g., because a location update cannot be performed while the CS session is active).

Next, assume that the mobile station 105 detects CSG cell C (120) and performs a CSG access check to determine whether: (i) the CSG cell's PLMN and CSG ID are in the whitelist; and (ii) that the CSG cell's PLMN ID corresponds to the mobile station's RPLMN or is in the mobile station's EPLMN list. In the illustrated example, both portions of the CSG access check pass and, thus, the mobile station 105 sends a measurement report for the CSG cell 120 to the BSS 140.

In response to receiving the measurement report, the BSS 140 initiates a CS-only handover to the CSG cell 120 for the mobile station 105. This causes MSC B (150) to perform a CSG check to determine whether: (i) the CSG cell's PLMN and CSG ID are in the CSG whitelist of the mobile station 105; and (ii) whether the CSG cell's PLMN ID corresponds to the mobile station's RPLMN or is in the mobile station's EPLMN list. In the illustrated example, the first portion of the CSG access check passes because MSC B (150) received the mobile station's CSG whitelist from MSC A (145) due to the CS-only handover. However, in the illustrated example scenario, MSC B (150) does not know the mobile station's EPLMN list (which contains PLMN C, which is the PLMN of the CSG cell 120) and, therefore, the second portion of the CSG access check performed by MSC B (150) fails. Thus, when prior CSG access checking rules are used, the CS-only handover to CSG cell C (120) fails due to the MSC's access check having failed.

In contrast, consider an example PS-only handover scenario in which the PS-only handover to CSG cell C (120) succeeds. In this example scenario, the mobile station 105 begins in cell A (110), and its RPLMN is PLMN A, whereas its EPLMN list is empty. The mobile station 105 then enters PS connected mode and completes a PS-only handover to cell B (115) in PLMN B. Immediately after the handover (e.g., before any routing area update), the mobile station's RPLMN is still PLMN A. Also, the mobile station's CSG whitelist is passed to SGSN B (160). Then, when the mobile station 105 performs a routing area update (e.g., which is permitted although the PS session is still active), the RPLMN for the UE becomes PLMN B and assume that the EPLMN list provided in the update includes PLMN C. At this point in the scenario, SGSN B (160) knows the RPLMN and EPLMN list for the mobile station 105.

Next, assume that the mobile station 105 detects CSG cell C (120) and performs a CSG access check to determine whether: (i) the CSG cell's PLMN and CSG ID are in the whitelist; and (ii) that the CSG cell's PLMN ID corresponds to the mobile station's RPLMN or is in the mobile station's EPLMN list. In the illustrated example, both portions of the CSG access check pass and, thus, the mobile station 105 sends a measurement report for the CSG cell 120 to the BSS 140.

In response to receiving the measurement report, the BSS 140 initiates a PS-only handover to the CSG cell 120 for the mobile station 105. This causes SGSN B (160) to perform a CSG check to determine whether: (i) the CSG cell's PLMN and CSG ID are in the CSG whitelist of the mobile station 105; and (ii) whether the CSG cell's PLMN ID corresponds to the mobile station's RPLMN or is in the mobile station's EPLMN list. In the illustrated example, the first portion of the CSG access check passes because SGSN B (160) received the mobile station's CSG whitelist from SGSN A (150) due to the PS-only handover. In this example scenario, the second portion of the access check performed by SGSN B (160) also passes because, due to the routing area update, SGSN B (160) knows the mobile station's EPLMN list (which contains PLMN C, which is the PLMN of the CSG cell 120). Accordingly, the PS-only handover to CSG cell C (120) succeeds.

With reference to the example of FIG. 2, other problems related to CSG access checking can arise if, for example, the EPLMN list from cell A (110) includes PLMN C (which is assumed to be the PLMN ID for the CSG cell 120), but the EPLMN list that is obtained during a routing area update in cell B (115) does not include PLMN C. In such an example, after a CS-only handover, the mobile station's CSG access check would pass because no location update can occur while the CS session is active and, thus, PLMN C is still in the mobile station's unmodified EPLMN list. However, after a DTM handover and a routing area update, the mobile station's CSG access check would pass because the new EPLMN list obtained by the routing area update does not contain PLMN C.

The foregoing examples illustrate problems that can occur using prior CSG access checking rules under scenarios in which a mobile station (e.g., the mobile station 105) and the CN nodes (e.g., the MSC 155 and the SGSN 160) have different knowledge concerning the PLMN information (e.g., the RPLMN and EPLMN list) associated with the mobile station 105. In the following, let the RPLMN and EPLMN list that the mobile station 105 has prior to handover be referred to as "List A," and let the RPLMN and EPLMN list obtained by the mobile station 105 from a subsequent routing area update procedure be referred to as "List B." Table 1 summarizes example scenarios in which, when the mobile station 105 is determining whether to report the target CSG cell 120 (e.g., via a measurement report to be sent to the BSS 120, which may cause the BSS 120 to initiate a handover of the mobile station 105 to the target CSG cell 120), the PLMN information known by the MSC 155 for the mobile station 105 is different from the PLMN information known by the SGSN 160 for the mobile station 105, and/or is different from the PLMN information known by the mobile station 105 itself.

TABLE 1

| UE Operating Mode | UE PLMN list at start | Handover is DTM? | RAU performed immediately after handover? | PLMN list at new MSC | PLMN list at new SGSN | PLMN list at UE after handover |
|---|---|---|---|---|---|---|
| CS-only | List A | No | No | Unknown | n/a | List A |
| PS-only | List A | No | Yes | n/a | List B | List B |
| DTM | List A | Yes | Yes | Unknown | List B | List B |

FIGS. 3-6 illustrate respective block diagrams of an example MSC 300, an example implementation of the mobile station 105, and example BSS 500 and an example SGSN 600 that individually and/or collectively can implement one or more example approaches disclosed above and in greater detail below for checking access to CSG cells (e.g., the CSG cell 120) in the mobile network 100. The MSC 300 of FIG. 3 can be used to implement MSC A (145) and/or MSC B (150), the BSS 500 of FIG. 5 can be used to implement BSS A (135) and/or BSS B (140), and the SGSN 600 can be used to implement SGSN A (155) and/or SGSN B (160). As described in greater detail below, the CSG access checking approaches implemented by the MSC 300, mobile station 105, BSS 500 and SGSN 600 can, among other things, address at least some of the problems discussed above that may occur with prior CSG access checking rules when the PLMN information known by the MSC 300 for the mobile station 105 is different from the PLMN information known by the SGSN 600 for the mobile station 105, and/or is different from the PLMN information known by the mobile station 105 itself (see Table 1).

Figure 3:
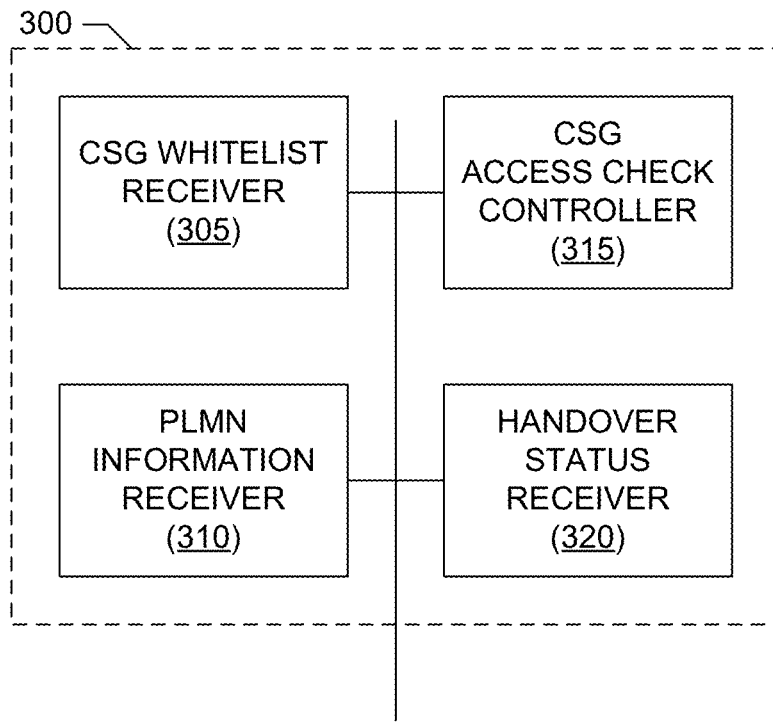
FIG. 3 is a block diagram of an example mobile switching center (MSC) that can be used to implement the mobile network of FIG. 1.

Turning to FIG. 3, the example MSC 300 may be used to implement MSC A (145) and/or MSC B (150). For convenience, and without loss of generality, the MSC 300 is described from the perspective of implementing MSC B (150). In the illustrated example, the MSC 300 includes an example CSG whitelist receiver 305 to receive CSG whitelist(s) for UEs, such as the mobile station 105, served by the MSC 300. For a particular UE, the CSG whitelist receiver 305 receives the UE's CSG whitelist from, for example, a prior (or source) MSC (e.g., such as the MSC 145) that previously served the UE.

The MSC 300 of FIG. 3 also includes an example PLMN information receiver 310 to receive PLMN information for UEs, such as the mobile station 105, served by the MSC 300. For example, the PLMN information received by the PLMN information receiver 310 can correspond to the RPLMN and EPLMN list determined for the UE during a most recent CS domain registration procedure, such as a location update procedure.

The MSC 300 of FIG. 3 also includes an example CSG access check controller 315 to control the CSG access checks performed by the MSC 300 for the UEs served by the MSC 300. In some examples, the MSC 300 of FIG. 3 further includes an example handover status receiver 320 to receive a status of a handover being performed by a UE being served by the MSC 300. Operation of the CSG whitelist receiver 305, the PLMN information receiver 310, the CSG access check controller 315 and the handover status receiver 320 of the MSC 300 to implement one or more disclosed example approaches for checking access to CSG cells in the mobile network 100 is described in greater detail below.

Figure 4:
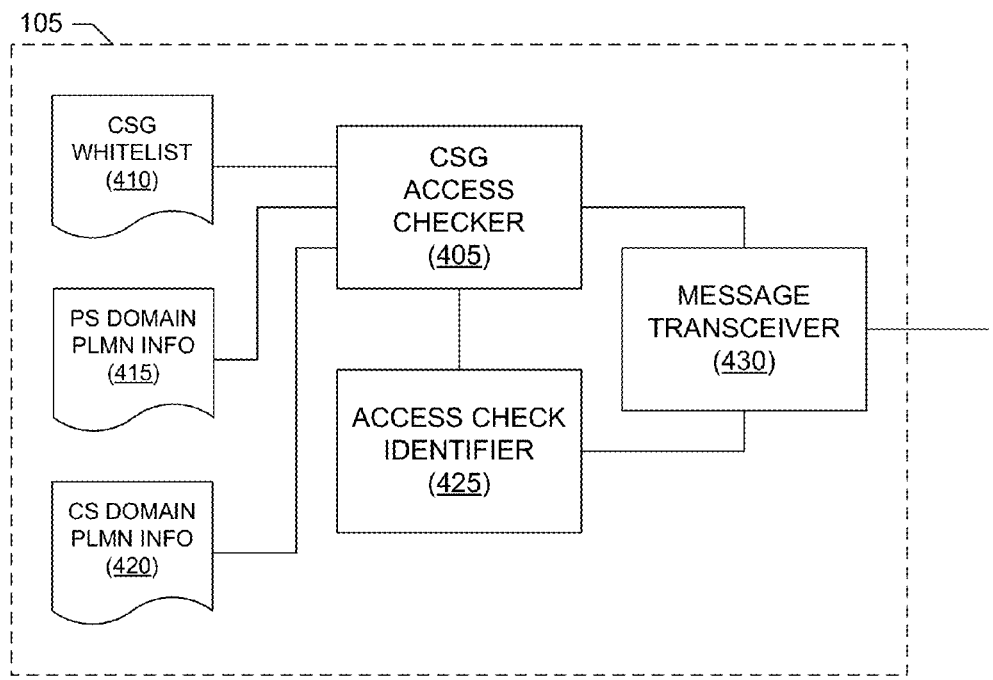
FIG. 4 is a block diagram of example mobile station that can be used to implement the mobile network of FIG. 1.

Turning to FIG. 4, the example implementation of the mobile station 105 illustrated therein includes an example CSG access checker 405 to perform CSG access checks using one or more of an example CSG whitelist 410, example PS domain PLMN information 415 and/or example CS domain PLMN information 420. As described above, the CSG whitelist 410 includes, for example, data tuples containing CSG IDs and PLMN IDs for which the mobile station 105 has been granted access. The PS domain PLMN information 415 includes, for example, the RPLMN and EPLMN list obtained by the mobile station 105 during a most recent PS domain registration procedure (e.g., such as a routing area update procedure). The CS domain PLMN information 420 includes, for example, the RPLMN and EPLMN list obtained by the mobile station 105 during a most recent CS domain registration procedure (e.g., such as a location update procedure).

In some examples, the mobile station 105 of FIG. 4 also includes an example access check identifier 425 to identify which of multiple possible CSG access checks performed by the CSG access checker 405 has succeeded and, thus, indicate that the mobile station 105 can access a target CSG cell. In some examples, the mobile station 105 of FIG. 4 further includes an example message transceiver 430 to send messages, which relate to the CSG access checking performed by the mobile station 105, to a serving BSS (e.g., such as the BSS 500, the BSS 135, the BSS 140, etc.). Operation of the CSG access checker 405, the access check identifier 425 and the message transceiver 430 of the mobile station 105 to implement one or more disclosed example approaches for checking access to CSG cells in the mobile network 100 is described in greater detail below.

Figure 5:
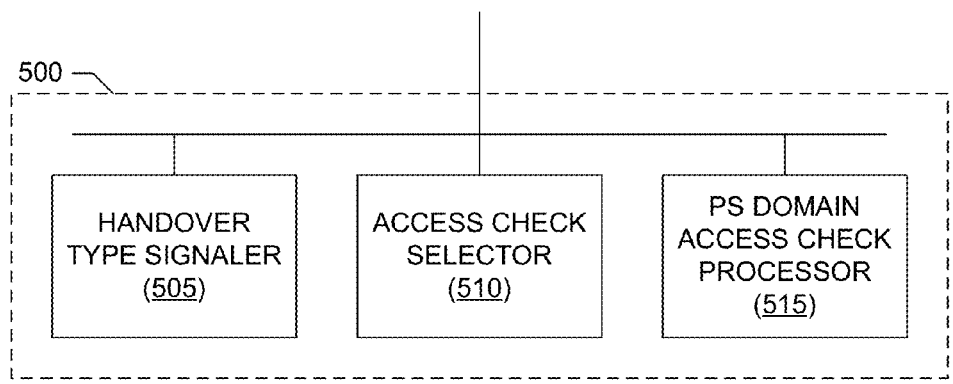
FIG. 5 is a block diagram of example base station subsystem (BSS) that can be used to implement the mobile network of FIG. 1.

Turning to FIG. 5, the example BSS 500 may be used to implement BSS A (135) and/or BSS B (140). For convenience, and without loss of generality, the BSS 500 is described from the perspective of implementing BSS B (140). In some examples, the BSS 500 includes an example handover type signaler 505 to send messages indicating the type of handover procedures to be performed for UEs, such as the mobile station 105, undergoing handover and served by the BSS 500. In some examples, the BSS 500 additionally or alternatively includes an example access check selector 510 to determine which of multiple possible CSG access checks have been reported by a UE, such as the mobile station 105, as being successful and, thus, indicate that the mobile station 105 can access a target CSG cell. In some examples, the BSS 500 additionally or alternatively includes an example PS domain access check processor 515 to process CSG access check results provided by PS domain CN nodes (such as the SGSN 600, the SGSN 155 and/or the SGSN 160) for UEs, such as the mobile station 105, attempting to access target CSG cells. Operation of the handover type signaler 505, the access check selector 510 and the PS domain access check processor 515 of the BSS 500 to implement one or more disclosed example approaches for checking access to CSG cells in the mobile network 100 is described in greater detail below.

Figure 6:
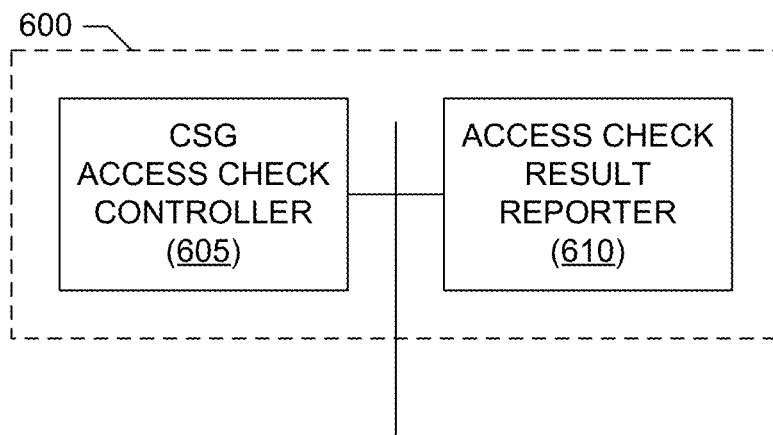
FIG. 6 is a block diagram of example serving general packet radio service (GPRS) support node (SGSN) that can be used to implement the mobile network of FIG. 1.

Turning to FIG. 6, the example SGSN 600 may be used to implement SGSN A (155) and/or SGSN B (160). For conve- Table 2 illustrates how the first example approach for checking access to CSG cells changes the scenario results shown in Table 1. As shown in Table 2, the first example approach for checking access to CSG cells addresses the CS-only handover scenario (e.g., because the UE and MSC both have List A), but may not address the DTM handover scenario (e.g., if List A and List B are different).

TABLE 2

| UE Operating Mode | UE PLMN list at start | Handover is DTM? | RAU performed immediately after handover? | PLMN list at new MSC | PLMN list at new SGSN | PLMN list at UE after handover |
|---|---|---|---|---|---|---|
| CS-only | List A | No | No | List A | n/a | List A |
| PS-only | List A | No | Yes | n/a | List B | List B |
| DTM | List A | Yes | Yes | List A | List B | List B | nience, and without loss of generality, the SGSN 600 is described from the perspective of implementing SGSN B (160). In some examples, the SGSN 600 includes an example CSG access check controller 605 to control the CSG access checks performed by the SGSN 600 for the UEs served by the SGSN 600. In some examples, the SGSN 600 of FIG. 6 additionally or alternatively includes an example access check result reporter 610 to report results of CSG access checks performs by the SGSN 600 to a BSS (e.g., such as the BSS 500, the BSS 135, the BSS 140, etc.). Operation of the CSG access check controller 605 and the access check result reporter 610 of the SGSN 600 to implement one or more disclosed example approaches for checking access to CSG cells in the mobile network 100 is described in greater detail below.

A first example approach for checking access to CSG cells disclosed herein can be implemented by the MSC 300. In this first example approach, the MSC 300 (e.g., via its PLMN information receiver 310) obtains CS domain PLMN information (e.g., the RPLMN and EPLMN list) for a UE, such as the mobile station 105, from a prior (source) MSC (such as the MSC 145) that previously served the UE. For example, the MSC 300, via its PLMN information receiver 310, can receive CS domain PLMN information for a UE, which performed a handover into the MSC's coverage area, from the source MSC and without a CS domain registration procedure (e.g., location update procedure) being required. Additionally, the MSC 300, via its CSG whitelist receiver 305, can receive the CSG whitelist for the UE, which performed a handover into the MSC's coverage area, from the source MSC. The MSC 300 can then use the received CSG whitelist and CS domain PLMN information to perform CSG access checking for the UE (e.g., if a handover of the UE to a CSG cell is subsequently attempted). In some examples, the PLMN information receiver 310 receives the CS domain PLMN information from the source MSC via a mobile application part (MAP) interface.

This first example approach for checking access to CSG cells addresses at least some of the problems described above associated with performing CSG access checks after a CS-only handover. In particular, in the first example approach, and with reference to Table 1 above, the MSC 300 can use the RPLMN and EPLMN list information (e.g., List A in Table 1) obtained from the source MSC and corresponding to a most recent CS-domain (or combined CS and PS domain) registration procedure to perform CSG access checking, and this PLMN information will be consistent with the RPLMN and EPLMN list information (e.g., List A in Table 1) at the UE.

A second example approach for checking access to CSG cells disclosed herein is an enhancement of the first example approach described above and supports DTM handover. Under the second example approach, in a DTM handover to a target CSG cell, the serving SGSN refrains from performing the CSG access check, and the UE uses a CS domain RPLMN and EPLMN list for performing its CSG access check. This second example approach can be implemented by the MSC 300, the mobile station 105, the BSS 500 and the SGSN 600. In the second example approach, the MSC 300 operates in accordance with the first example approach described above for checking access to CSG cells. As such, when the mobile station 105 attempts to access a CSG cell (e.g., the CSG cell 120) after a CS handover or DTM handover, the MSC 300 (e.g., implementing the MSC 150) uses the RPLMN and EPLMN list information (e.g., List A in Table 1) obtained from the source MSC (e.g., the MSC 145) and corresponding to a most recent CS-domain (or combined CS and PS domain) registration procedure to perform CSG access checking for the UE.

Additionally, in the second example approach for checking access to CSG cells, the mobile station 105 uses the CS domain PLMN info 420 to perform CSG access checking (e.g., using its CSG access checker 405), as described above. The CS domain PLMN info 420 used by the CSG access checker 405 to perform CSG access checking at the mobile station 105 corresponds to the RPLMN and EPLMN list information (e.g., List A in Table 1) obtained via a most recent CS-domain (or combined CS and PS domain) registration procedure and, thus, is consistent with the PLMN information being used by the MSC 300 to perform CSG access checking. In some examples, to ensure that the CS domain PLMN info 420 is available when performing CSG access checking, the mobile station 105 stores the RPLMN and EPLMN list information obtained via a most recent CS-domain registration procedure before obtaining a new RPLMN and EPLMN list via a subsequent PS domain registration procedure.

When a subsequent DTM handover of the mobile station 105 to a CSG cell, (e.g., the CSG cell 120) is attempted, the second example approach for checking access to CSG cells further involves the BSS 500 (e.g., implementing the BSS 140) signaling (e.g., via its handover type signaler 505) the SGSN 600 (e.g., implementing the SGSN 160) to inform the SGSN 600 that the handover being performed for the mobile station 105 is a DTM handover. In response to receiving the signaling, the SGSN 600 (e.g., via its CSG access check controller 605), causes the SGSN 600 to omit (e.g., disable) CSG access checking (or at least the PLMN checking portion of the CSG access check) when determining whether the PS-domain portion of the DTM handover can proceed to the target CSG cell. As such, CSG access checking in the second example approach relies on the CS domain PLMN information known by the MSC 300 and the mobile station 105 to check and confirm that the mobile station 105 is permitted to access the target CSG cell. In some examples, the BSS 500 signals the type of handover being performed to the SGSN 600 via an additional information element (IE), such as a "DTM Indication" IE, included in the PS-HANDOVER-REQUIRED message (see 3GPP TS 48.018) sent from the BSS 500 to the SGSN 600 during the PS handover preparation phase (see 3GPP TS 43.029).

A third example approach for checking access to CSG cells disclosed herein can be implemented by the MSC 300, the mobile station 105 and the BSS 500. The third example approach for checking access to CSG cells is applicable for a DTM handover of a UE (e.g., the mobile station 105) to a CSG cell (e.g., the CSG cell 120) after a DTM handover, or after a CS-only handover. In this third example approach for checking access to CSG cells, the mobile station 105 uses a PS domain RPLMN and EPLMN list to perform its CSG access check, and the serving MSC 300 does not perform a CSG access check. In an example implementation, the BSS 600 (e.g., implementing the BSS 140) instructs (e.g., via its handover type signaler 505) the MSC 300 (e.g., implementing the MSC 150) that the handover is a DTM handover. In response, the MSC 300 (e.g., via its CSG access check controller 315), causes the MSC 300 to omit (e.g., disable) CSG access checking when determining whether the CS-domain portion of the DTM handover can proceed to the target CSG cell.

In the third example approach for checking access to CSG cells, the mobile station 105 in DTM uses the PS domain PLMN info 415 to perform CSG access checking (e.g., using its CSG access checker 405) to determine whether to report a target CSG cell, as described above. The PS domain PLMN info 420 used by the CSG access checker 405 to perform CSG access checking at the mobile station 105 corresponds to the RPLMN and EPLMN list information (e.g., List B in Table 1) obtained via a most recent PS-domain registration procedure (e.g., a routing area update procedure) and, thus, is consistent with the PLMN information being used by the SGSN (e.g., the SGSN 160) to perform CSG access checking as part of the PS-domain portion of the DTM handover to the target CSG cell.

In this third example approach for checking access to CSG cells, on the network side, only the SGSN performs the complete CSG access check. However, if the PS domain portion of the handover fails, the serving BSS 200 still needs to know whether the CSG access check passed or failed. Otherwise, the serving BSS 200 could assume that the failure was for non-access check reasons, and carry on with a CS-only handover (because a CS-only handover is a valid outcome if there is failure of the PS part of DTM handover).

Furthermore, this third example approach for checking access to CSG cells is applicable only for DTM handover to the target CSG cell (e.g., the CSG cell 120) in which the mobile station 105 is in DTM and the BSS 200 (e.g., implementing the BSS 140) attempts a DTM handover to the target CSG cell. Conversely, if the BSS 200 attempts a CS-only handover to the target CSG cell while the mobile station 105 is currently in DTM, there is currently no mechanism for the mobile station 105 to know whether the BSS 200 is attempting a DTM handover or a CS-only handover. Thus, under the third example approach, the mobile station 105 would use the PS-domain PLMN information (e.g., List B in Table 1), whereas the MSC 300 has either no PLMN information (because a CS domain registration procedure cannot be performed while the CS session in DTM is active) or, in the case of the first and second example approaches, has potentially different CS-domain PLMN information (e.g., List A in Table 1).

A fourth example approach for checking access to CSG cells disclosed herein can be implemented by the MSC 300, the mobile station 105 and the BSS 500, and involves the MSC 300 performing a modified CSG access check. The fourth example approach for checking access to CSG cells, like the third example approach, is applicable for a DTM handover of the UE (e.g., the mobile station 105) to a CSG cell (e.g., the CSG cell 120) after a DTM handover, or after a CS-only handover. In the fourth example approach for checking access to CSG cells, as in the third example approach described above, the mobile station 105 uses the PS domain PLMN info 415 (e.g., the PS domain RPLMN and EPLMN list corresponding to List B in Table 1) to perform CSG access checking (e.g., using its CSG access checker 405) while in DTM and determining whether to report a target CSG cell (e.g., the CSG cell 120). Furthermore, in contrast with the third example approach described above, the MSC 300 (e.g., implementing the MSC 150) also performs a CSG access check, but omits the PLMN portion of the check (e.g., and just checks whether the CSG ID of the target CSG cell is in the mobile station's CSG whitelist). This fourth example approach for checking access to CSG cells is limited to DTM handovers to the target CSG cell for reasons similar to those for the third example approach described above.

A fifth example approach for checking access to CSG cells disclosed herein can be implemented by the mobile station 105 and involves having the mobile station 105 use both old and new RPLMN and EPLMN lists when performing CSG access checking. This fifth example approach addresses at least some of the issues associated with the first through fourth example approaches described above. The fifth example approach for checking access to CSG cell attempts to reduce the risk that the mobile station's CSG access check is inconsistent with either of the CSG access checks performed by the service SGSN and MSC, regardless of whether they would actually be carried out during a handover to a target CSG cell. To reduce this risk, in the fifth example approach for checking access to CSG cells, the mobile station 105 performs two CSG access checks (e.g., using its CSG access checker 405) to determine whether the mobile station 105 can access the target CSG cell. For example, the mobile station 105 performs a first CSG access check (e.g., with its CSG access checker 405) using the PS domain PLMN info 415 (e.g., the PS domain RPLMN and EPLMN list corresponding to List B in Table 1) and a second CSG access check (e.g., with its CSG access checker 405) using the CS domain PLMN info 420 (e.g., the CS domain RPLMN and EPLMN list corresponding to List A in Table 1). The mobile station 105 then requires both CSG access checks (e.g., corresponding to CSG access checking using both the CS domain PLMN information in the serving MSC and obtained via the most recent CS-domain registration, and the PS domain PLMN information in the serving SGSN and obtained via the most recent PS-domain registration) to be successful in order for the mobile station 105 to determine that it can access the target CSG cell and, thus, whether it can send a measurement report for the CSG cell (e.g., to initiate a handover).

By requiring both access checks performed by the mobile station 105 to be successful in order to perform a handover to the target CSG cell, the fifth example approach for checking access to CSG cells ensures that the PLMN ID of the CSG cell is in both the {RPLMN, EPLMN} list as used in the CS domain in the old cell (e.g., and as obtained via the most recent CS domain registration procedure) and the {RPLMN, EPLMN} list obtained via a later PS domain registration procedure. Accordingly, if both CSG access checks are performed and successful in the mobile station 105, the corresponding access checks in the MSC and SGSN will also pass. Thus, the fifth example approach for checking access to CSG cells causes the mobile station 105 to limit its reporting of a target CSG cell (e.g., the CSG cell 120) to situations in which the CSG access tests performed by the serving MSC (e.g., the MSC 150) and the serving SGSN (e.g., the SGSN 160) will both pass. Accordingly, this fifth example approach can be implemented by the mobile station 105 without impacting the serving MSC or SGSN.

A sixth example approach for checking access to CSG cells disclosed herein is based on synchronizing operation between the BSS and UE and can be implemented by the mobile station 105 and the BSS 500. As noted above, a prior 3GPP-compliant UE does not know whether the BSS will ultimately initiate a DTM handover or CS-only handover when the UE is determining whether it can access a target CSG cell and, thus, when it is determining whether to send a measurement report including a target CSG cell. As such, if the CSG access check behavior in the core network (or the outcome(s) thereof) for DTM handover is potentially different from that for a CS-only handover, a prior 3GPP-compliant UE does not know which CSG access check will ultimately be relied upon by the network. To avoid at least some of the problems mentioned above, it would be desirable if the UE could synchronize its CSG access check with the access check the core network (e.g., the MSC and/or SGSN) will perform.

A first example implementation of the sixth example approach for checking access to CSG cells achieves such synchronization by having the mobile station 105, which is determining whether to report (e.g., via a measurement report) a CSG cell (e.g., the CSG cell 120), perform either a first CSG access check (e.g., with its CSG access checker 405) using the PS domain PLMN info 415 (e.g., the PS domain RPLMN and EPLMN list corresponding to List B in Table 1) or a second CSG access check (e.g., with its CSG access checker 405) using the CS domain PLMN info 420 (e.g., the CS domain RPLMN and EPLMN list corresponding to List A in Table 1). The mobile station 105 then sends a message (e.g., prepared via its access check identifier 425 and sent via its message transceiver 430) to the BSS 500 (e.g., implementing the BSS 140) indicating which CSG access check was performed by the mobile station 105. In response to the message, the BSS 500 requests (e.g., via its access check selector 510) the serving SGSN to perform the CSG access check (e.g., the SGSN 160) if the mobile station 105 reports that the first check was performed, or the serving MSC to perform the CSG access check (e.g., the MSC 150) if the mobile station 105 reports that the second check was performed. In some examples, the BSS 500 requests (e.g., via its access check selector 510) that both the serving SGSN and the serving MSC perform the CSG access check (e.g., the SGSN 160) if the mobile station 105 reports that both the first check and the second check were performed. To avoid the need for modifying the signaling in the MS to BSS direction, the selection of the which access check to perform at the mobile station 105 can be preconfigured, specified via control information transmitted by the BSS 500 to the mobile station 105, etc. In such examples, the BSS 500 can request the core network access checks accordingly (e.g., consistent with the configuration of and/or signaling sent to the mobile station 105).

A second example implementation of the sixth example approach for checking access to CSG cells achieves such synchronization by having the mobile station 105, which is determining whether to report a CSG cell (e.g., the CSG cell 120), perform both a first CSG access check (e.g., with its CSG access checker 405) using the PS domain PLMN info 415 (e.g., the PS domain RPLMN and EPLMN list corresponding to List B in Table 1) and a second CSG access check (e.g., with its CSG access checker 405) using the CS domain PLMN info 420 (e.g., the CS domain RPLMN and EPLMN list corresponding to List A in Table 1). The mobile station 105 then sends a message (e.g., prepared via its access check identifier 425 and sent via its message transceiver 430) to the BSS 500 (e.g., implementing the BSS 140) indicating which of the CSG access check(s) performed by the mobile station 105 succeeded and, thus, indicated that the mobile station 105 can access the target CSG cell. In response to the message, the BSS 500 requests (e.g., via its access check selector 510) the serving SGSN to perform the CSG access check result (e.g., the SGSN 160) if the mobile station 105 reports that the first check succeeded, or the serving MSC to perform the CSG access check result (e.g., the MSC 150) if the mobile station 105 reports that the second check was performed. In some examples, the BSS 500 requests (e.g., via its access check selector 510) that both the serving SGSN and the serving MSC perform the CSG access check (e.g., the SGSN 160) if the mobile station 105 reports that both of its checks succeeded.

A third example implementation of the sixth example approach for checking access to CSG cells achieves such synchronization by having the mobile station 105, which is determining whether to report a CSG cell (e.g., the CSG cell 120), perform both a first CSG access check (e.g., with its CSG access checker 405) using the PS domain PLMN info 415 (e.g., the PS domain RPLMN and EPLMN list corresponding to List B in Table 1) and a second CSG access check (e.g., with its CSG access checker 405) using the CS domain PLMN info 420 (e.g., the CS domain RPLMN and EPLMN list corresponding to List A in Table 1). The mobile station 105 then sends a measurement report for the target CSG cell to the BSS 500 (e.g., implementing the BSS 140), which indicates that the mobile station 105 can access the target CSG cell (and, thus, can be used to initiate a handover), only if both CSG access checks are successful (which is similar to the fifth example approach described above for checking access to CSG cells).

In some examples, the mobile station 105 can include an indication of which CSG access check was used and/or which succeeded in the measurement report for the target CSG cell that is sent to the BSS 500. In other examples, the mobile station 105 can send a separate message to the BSS 500 to indicate which CSG access check was used to check the access to the target CSG cell, and/or which succeeded.

In some examples, the BSS 500 is configured to always attempt a DTM handover to a CSG cell (e.g., the CSG cell 120) for a UE, such as the mobile station 105, that is in DTM when it is attempting to perform a handover to the target CSG cell. The mobile station 105 then always applies the DTM-relevant CSG access check (e.g., based on the PS domain PLMN info 415 or the PS domain RPLMN and EPLMN list corresponding to List B in Table 1). Conversely, in some examples, the BSS 500 is configured to always attempt a CS handover to a CSG cell (e.g., the CSG cell 120) for a UE, such as the mobile station 105, that is in DTM when the BSS 500 decides to handover the UE to the target CSG cell. The mobile station 105 then always applies the CS-only CSG access check (e.g., based on the CS domain PLMN info 420 or the CS domain RPLMN and EPLMN list corresponding to List A in Table 1). Such examples involve no additional signaling between the BSS 500 and the mobile station 105.

In some examples, the BSS 500 informs a UE, such as the mobile station 105, beforehand of which CSG access check option the BSS 500 will use so the UE knows which test to apply. The UE then applies the appropriate CSG access check. This signaling could be added to one or more DTM assignment messages, which may be any message that can cause a mobile to enter DTM (see 3GPP TS 44.018 and 44.060). In some examples, an indication that, for example, the BSS 500 does not support DTM handover would suffice in that it indicates that all handovers will be CS-only in nature.

In yet another example implementation of the sixth example approach for checking access to CSG cells, which is related to the second example implementation described above, an MS that supports handover to CSG cells, such as the mobile station 105, shall store the EPLMN list and RPLMN that were valid after the most recent of any successful location updating procedure, combined GPRS attach procedure, or combined routing area updating procedure separately from the EPLMN list and RPLMN indicated in the routing area update procedure. The EPLMN list and RPLMN that were valid after the most recent location updating procedure are referred to as the "CS EPLMN list and RPLMN" and are not modified by a routing area update procedure.

In such an example, the mobile station 105 in dedicated mode or dual transfer mode may report a UTRAN CSG cell or hybrid cell if: (i) the mobile station 105 has received the UTRAN CSG Cells Reporting Description IE from the network 100 in the SI2quater or MEASUREMENT INFORMATION message; (ii) the mobile station 105 has determined that it is allowed to access the cell, i.e. the CSG ID and the PLMN ID of the CSG cell or hybrid cell matches one of the CSG IDs with their associated PLMN IDs stored in its CSG whitelist and either (a) the PLMN ID of the CSG cell or hybrid cell, for the mobile station 105 when in dedicated mode, matches either the PLMN ID of either the RPLMN or one of the EPLMNs (if any) in the "CS EPLMN list and RPLMN" or, if the mobile station 105 does not have a "CS EPLMN list and RPLMN", either the RPLMN or one of the EPLMNs (if any) received during latest registration or registration update with CS domain, or (b) the PLMN ID of the CSG cell or hybrid cell, for the mobile station 105 when in dual transfer mode, meets the requirement for the mobile station 105 when in dedicated mode or (if different) matches either the registered PLMN ID or is in the list of equivalent PLMNs. (Note that the "CS EPLMN list and RPLMN" may be different from the RPLMN and EPLMN list if the mobile station 105 has performed a routing area update since performing a CS domain registration or registration update procedure.) Also, the mobile station 105, when in DTM or when it has a "CS EPLMN list and RPLMN" which does not match the RPLMN and EPLMN list, reports which requirements are met in a DTM_ACCESS_CHECK_RESULT field in a MEASUREMENT REPORT message or an ENHANCED MEASUREMENT REPORT message. An example of such a DTM_ACCESS_CHECK_RESULT field is illustrated in Table 3:

TABLE 3

| DTM_ACCESS CHECK_RESULT (2 bit field) |
|---|
| This field shall be set to '00' by an MS which has a "CS EPLMN list and RPLMN" which matches the RPLMN and EPLMN list. Otherwise, the mobile station shall set this field as follows: |
| bit |
| 2 1 |
| 0 0 MS has a "CS EPLMN list and RPLMN" which matches the RPLMN and EPLMN list (e.g. MS is not in DTM) |
| 0 1 PLMN ID of CSG cell meets the requirement for an MS in dedicated mode only; the PLMN ID of the CSG cell does not match either the registered PLMN ID or is in the list of equivalent PLMNs |
| 1 0 PLMN ID of CSG cell does not meet the requirement for an MS in dedicated mode; the PLMN ID of the CSG cell matches either the registered PLMN ID or is in the list of equivalent PLMNs |
| 1 1 PLMN ID of CSG cell meets the requirement for an MS in dedicated mode and the PLMN ID of the CSG cell matches either the registered PLMN ID or is in the list of equivalent PLMNs |

In a further example implementation of the sixth example approach for checking access to CSG cells, which is related to the third example implementation described above, an MS that supports handover to CSG cells, such as the mobile station 105, shall store the EPLMN list and RPLMN that were valid after the most recent of any successful location updating procedure, combined GPRS attach procedure, or combined routing area updating procedure separately from the EPLMN list and RPLMN indicated in the routing area update procedure. The EPLMN list and RPLMN that were valid after the most recent location updating procedure are referred to as the "CS EPLMN list and RPLMN" and are not modified by a routing area update procedure.

In such an example, the mobile station 105 in dedicated mode or dual transfer mode may report a UTRAN CSG cell or hybrid cell if: (i) the mobile station 105 has received the UTRAN CSG Cells Reporting Description IE from the network in the SI2quater or MEASUREMENT INFORMATION message; (ii) the mobile station 105 has determined that it is allowed to access the cell, i.e. the CSG ID and the PLMN ID of the CSG cell or hybrid cell matches one of the CSG IDs with their associated PLMN IDs stored in its CSG whitelist and either (a) the PLMN ID of the CSG cell or hybrid cell, for the mobile station 105 when in dedicated mode, matches either the PLMN ID of either the RPLMN or one of the EPLMNs (if any) in the "CS EPLMN list and RPLMN" or, if the mobile station 105 does not have a "CS EPLMN list and RPLMN", either the RPLMN or one of the EPLMNs (if any) received during latest registration or registration update with CS domain, or (b) the PLMN ID of the CSG cell or hybrid cell, for the mobile station 105 when in dual transfer mode, meets the requirement for the mobile station 105 in dedicated mode and matches either the registered PLMN ID or is in the list of equivalent PLMNs. (Note that the "CS EPLMN list and RPLMN" may be different from the RPLMN and EPLMN list if the mobile station 105 has performed a routing area update since performing a CS domain registration or registration update procedure.)

A seventh example approach for checking access to CSG cells disclosed herein is based on passing access check results from a serving SGSN to a serving BSS, and can be implemented by the BSS 500 and the SGSN 600. In some examples, the MSC 300 may also be used in the implementation of the seventh example approach for checking access to CSG cells. In the seventh example approach for checking access to CSG cells, a serving MSC (e.g., the MSC 150) does not perform the CSG access check during a DTM handover to a target CSG cell (e.g., the CSG cell 120), or its CSG access check results are ignored. Furthermore, the outcome of the PS domain access check performed by the serving SGSN 600

(e.g., implementing the SGSN 160) is made known at the BSS 500 (e.g., implementing the BSS 140), even if the PS part of the DTM handover cannot proceed for another reason. In this way, the BSS 500 can determine whether it is permitted to proceed with the CS-only portion of the DTM handover if the PS portion fails.

Prior 3GPP specifications specify at least one mechanism to indicate to a source (e.g., serving) BSS that a PS handover cannot proceed due to the result of the CSG access check. For example, 3GPP Technical Specification (TS) 48.018, sub-clause 8a.4, states that: "If the SGSN receives the CSG Identifier IE in the PS-HANDOVER-REQUIRED PDU and the Cell Access Mode field is set to 'CSG cell,' it shall perform access control as specified in 3GPP TS 29.060. If the MS is allowed to access the target cell, the SGSN shall continue the PS handover to the target side as specified in 3GPP TS 29.060. If the MS is not allowed to access the target cell, the SGSN shall send the PS-HANDOVER-REQUIRED-NACK PDU with the Cause IE set to 'Invalid CSG cell' to the source BSS. If the Cell Access Mode field in the CSG Identifier IE is set to 'Hybrid cell,' the SGSN shall provide the CSG membership status of the MS and the CSG Id to the target side as specified in 3GPP TS 29.060."

In some examples of the seventh example approach for checking access to CSG cells, the serving SGSN access check is mandatory for some or all type of handovers to CSG cells. In a first example implementation, the serving SGSN access check may be made mandatory for all types of handovers to target CSG cells, an approach that does not involve new signaling between the serving BSS 500 and the serving SGSN 600. For example, in one such implementation, if the SGSN receives the CSG Identifier IE in the PS-HANDOVER-REQUIRED PDU and the Cell Access Mode field is set to "CSG cell," it shall perform access control whether or not the PS handover would otherwise be successful. If the MS is allowed to access the target cell, the SGSN shall continue the PS handover to the target side as specified. If the MS is not allowed to access the target cell, the SGSN shall send the PS-HANDOVER-REQUIRED-NACK PDU with the Cause IE set to "Invalid CSG cell" to the source BSS. If the Cell Access Mode field in the CSG Identifier IE is set to "Hybrid cell", the SGSN shall provide the CSG membership status of the MS and the CSG Id to the target side.

In a second example implementation of the seventh example approach for checking access to CSG cells, the serving SGSN access check may be made mandatory for just DTM handovers to target CSG cells, which may require signaling between the BSS 500 and SGSN 600 to indicate whether a DTM handover is being performed, but may simplify SGSN behavior for non-DTM handover cases. For example, in one such implementation, if the SGSN receives the CSG Identifier IE in the PS-HANDOVER-REQUIRED PDU and the Cell Access Mode field is set to "CSG cell", it shall perform access control. If the PS-HANDOVER-REQUIRED PDU included a DTM Handover IE, this access control shall be carried out whether or not the PS Handover would otherwise be successful. If the MS is allowed to access the target cell, the SGSN shall continue the PS handover to the target side. If the MS is not allowed to access the target cell, the SGSN shall send the PS-HANDOVER-REQUIRED-NACK PDU with the Cause IE set to "Invalid CSG cell" to the source BSS. If the Cell Access Mode field in the CSG Identifier IE is set to "Hybrid cell", the SGSN shall provide the CSG membership status of the MS and the CSG ID to the target side.

In either of the preceding example implementations, there are several alternative ways for the serving SGSN 600 to provide (e.g., via its access check result reporter 610) an SGSN indication of its access check result to the serving BSS 500. In a first example alternative, the "Invalid CSG cell" cause takes precedence in the PS-HANDOVER-REQUIRED-NACK PDU described above. In such an example, receipt of any other cause by the BSS 500 implies (e.g., to the BSS's PS domain access check processor 515) the SGSN's CSG access check is successful. For example, in one such implementation, when the SGSN 600 terminates the PS Handover Required procedure by sending a PS-HANDOVER-REQUIRED-NACK PDU to the source BSS, 500 the Cause IE is set to an appropriate value (e.g. "PFC create failure", "Cell traffic congestion", "Equipment failure", "O&M intervention", "PS Handover Target not allowed", "PS Handover not Supported in Target BSS or Target System" or "Invalid CSG cell"). In such an example, "Invalid CSG cell" is indicated, if applicable, regardless of any other valid cause value.

In a second example alternative, the "Invalid CSG" cause can be sent to the BSS 500 with another cause value. In such examples, absence of "Invalid CSG" cause implies (e.g., to the BSS's PS domain access check processor 515) that the SGSN's CSG access check is successful. For example, in one such implementation, when the SGSN 600 terminates the PS Handover Required procedure by sending a PS-HANDOVER-REQUIRED-NACK PDU to the source BSS 500, the Cause IE should be set to an appropriate value (e.g. "PFC create failure", "Cell traffic congestion", "Equipment failure", "O&M intervention", "PS Handover Target not allowed", "PS Handover not Supported in Target BSS or Target System" or "Invalid CSG cell"). In such an example. if "Invalid CSG cell" and one or more other cause values are applicable, the Cause IE shall indicate "Invalid CSG cell" and the Secondary Cause IE containing an additional cause may be included.

In a third example alternative, a separate IE is used to indicate the outcome of the SGSN's CSG access check. Such an IE provides confirmation (e.g., to the BSS's PS domain access check processor 515) that a CSG check in the CN was carried out. For example, in one such implementation, in the case of unsuccessful PS Handover, the source BSS 500 shall be notified through the PS-HANDOVER-REQUIRED-NACK PDU. If the SGSN 600 performed access control, the result of the access control shall be indicated in the Access Check Result IE.

Any of the example alternatives for making the SGSN access check mandatory for some or all type of handovers can be combined with any of the example alternatives for the serving SGSN 600 to provide an SGSN indication of its access check result to the serving BSS 500

In some examples of the seventh example approach for checking access to CSG cells, the BSS 500 (e.g., implementing the BSS 140) must wait for confirmation from the SGSN 600 (e.g., implementing the SGSN 160) that the SGSN's CSG access control procedure was successful before proceeding with a handover of the UE (e.g., the mobile station 105) to a target CSG cell (e.g., the CSG cell 120). In such examples, the BSS 500 (e.g., as controlled by its PS domain access check processor 515) is not permitted to proceed with either a CS-only or DTM handover to the target CSG cell based only on the response received from the serving MSC (e.g., the MSC 150). For example, in one such implementation, if, in the case of DTM handover command to a CSG cell, the BSS 500 receives from the MSC 300 a BSSMAP HANDOVER COMMAND message and the DTM Handover Command Indication field element is included within the New BSS to Old BSS Information IE, the BSS 300 shall wait until it receives a PS-HANDOVER-REQUIRED-ACK PDU (if it has not already received it from the SGSN 600) which indicates that the access control was carried out and that the mobile station 105 is allowed to access the CSG cell, then stop timer T23 and transmit the (RLC/MAC) DTM HANDOVER COMMAND radio interface message to the mobile station 105.

In some examples of the seventh example approach for checking access to CSG cells, regardless of whether the BSS 500 (e.g., implementing the BSS 140) receives a positive response from the serving MSC (e.g., the MSC 150) indicating that either a CS-only or DTM handover can proceed, if the BSS 500 receives an indication from the SGSN 600 (e.g., implementing the SGSN 160) that its access control procedure failed (or access control was not carried out), the BSS 500 (e.g., as controlled by its PS domain access check processor 515) cannot proceed with the handover to the target CSG cell (e.g., the CSG cell 120), and a new cause value can be sent to the serving MSC 300 (e.g., for receipt by its handover status receiver 320) to indicate this new reason for failure. For example, in one such implementation, if the BSS 500 receives a PS-HANDOVER-REQUIRED-NACK PDU indicating that either i) the access control was not carried out, or ii) the mobile station 105 is not allowed to access the CSG cell, then the BSS 500 sends a HANDOVER FAILURE message to the MSC 300 with cause "DTM Handover—Access control failure" (or some other similar cause value). In some such examples, no message shall be sent to the mobile station 105, regardless of the response received from the MSC.

In some examples, one or more of the approaches for checking access to CSG cells disclosed above could be limited to scenarios in which there has already been an inter-RAU handover (and/or inter PLMN handover) prior to attempting a handover to a target CSG cell on the basis that, prior to handover, both the serving SGSN and the serving MSC should perform their respective CSG access checks and, thus, obtain the same CSG access check results.

While example manners of implementing the mobile network 100 of FIGS. 1 and 2 has been illustrated in FIGS. 3-6, one or more of the elements, processes and/or devices illustrated in FIGS. 2-6 may be combined, divided, re-arranged, omitted, eliminated and/or implemented in any other way. Further, the example mobile device 105, the example BSSs 135, 140 and/or 500, the example MSCs 145, 150 and/or 300, the example SGSNs. 155, 160 and/or 600, the example CSG whitelist receiver 305, the example PLMN information receiver 310, the example CSG access check controller 315, the example handover status receiver 320, the example CSG access checker 405, the example access check identifier 425, the example message transceiver 430, the example handover type signaler 505, the example access check selector 510, the example PS domain access check processor 515, the example CSG access check controller 605, the example access check result reporter 610 and/or, more generally, the example mobile network 100 of FIGS. 1-6 may be implemented by hardware, software, firmware and/or any combination of hardware, software and/or firmware. Thus, for example, any of the example mobile device 105, the example BSSs 135, 140 and/or 500, the example MSCs 145, 150 and/or 300, the example SGSNs. 155, 160 and/or 600, the example CSG whitelist receiver 305, the example PLMN information receiver 310, the example CSG access check controller 315, the example handover status receiver 320, the example CSG access checker 405, the example access check identifier 425, the example message transceiver 430, the example handover type signaler 505, the example access check selector 510, the example PS domain access check processor 515, the example CSG access check controller 605, the example access check result reporter 610 and/or, more generally, the example mobile network 100 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example mobile network 100, the example mobile device 105, the example BSSs 135, 140 and/or 500, the example MSCs 145, 150 and/or 300, the example SGSNs. 155, 160 and/or 600, the example CSG whitelist receiver 305, the example PLMN information receiver 310, the example CSG access check controller 315, the example handover status receiver 320, the example CSG access checker 405, the example access check identifier 425, the example message transceiver 430, the example handover type signaler 505, the example access check selector 510, the example PS domain access check processor 515, the example CSG access check controller 605, and/or the example access check result reporter 610 are hereby expressly defined to include a tangible computer readable medium such as a memory, digital versatile disk (DVD), compact disk (CD), Blu-ray disc™, etc., storing such software and/or firmware. Further still, the example mobile network 100 may include one or more elements, processes and/or devices in addition to, or instead of, those illustrated in FIGS. 1-6, and/or may include more than one of any or all of the illustrated elements, processes and devices.

Flowcharts representative of example processes for implementing the example mobile network 100, the example mobile device 105, the example BSSs 135, 140 and/or 500, the example MSCs 145, 150 and/or 300, the example SGSNs. 155, 160 and/or 600, the example CSG whitelist receiver 305, the example PLMN information receiver 310, the example CSG access check controller 315, the example handover status receiver 320, the example CSG access checker 405, the example access check identifier 425, the example message transceiver 430, the example handover type signaler 505, the example access check selector 510, the example PS domain access check processor 515, the example CSG access check controller 605, and/or the example access check result reporter 610 are shown in FIGS. 7-18. In these examples, the process represented by each flowchart may be implemented by one or more programs comprising machine readable instructions for execution by a processor, such as the processor 1912 shown in the example processing system 1900 discussed below in connection with FIG. 19. The one or more programs, or portion(s) thereof, may be embodied in software stored on a tangible computer readable medium such as a CD-ROM, a floppy disk, a hard drive, a digital versatile disk (DVD), a Blu-ray disc™, or a memory associated with the processor 1912, but the entire program or programs and/or portions thereof could alternatively be executed by a device other than the processor 1912 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 7-18, or one or more portion(s) thereof, may be implemented manually. Further, although the example processes are described with reference to the flowcharts illustrated in FIGS. 7-18, many other methods of implementing the example mobile network 100, the example mobile device 105, the example BSSs 135, 140 and/or 500, the example MSCs 145, 150 and/or 300, the example SGSNs. 155, 160 and/or 600, the example CSG whitelist receiver 305, the example PLMN information receiver 310, the example CSG access check controller 315, the example handover status receiver 320, the example CSG access checker 405, the example access check identifier 425, the example message transceiver 430, the example handover type signaler 505, the example access check selector 510, the example PS domain access check processor 515, the example CSG access check controller 605, and/or the example access check result reporter 610 may alternatively be used. For example, with reference to the flowcharts illustrated in FIGS. 7-18, the order of execution of the blocks may be changed, and/or some of the blocks described may be changed, eliminated, combined and/or subdivided into multiple blocks.

As mentioned above, the example processes of FIGS. 7-18 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-18 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

For convenience, and without loss of generality, the example processes illustrated in FIGS. 7-18 are described from the perspective of the MSC 300 implementing the MSC B (150), the BSS 500 implementing BSS B (140), the SGSN 600 implementing SGSN B (160) and the mobile station 105 being implemented in accordance with the example of FIG. 4. Furthermore, the following descriptions of the example processes illustrated in FIGS. 7-18 assume that a DTM or CS-only handover of the mobile station 105 to CSG cell C (120) is being attempted after a DTM or CS-only handover from cell A (110) to cell B (115) has been performed, and without having terminated the CS session (e.g., corresponding to the example scenarios illustrated in FIG. 2).

Figure 7:
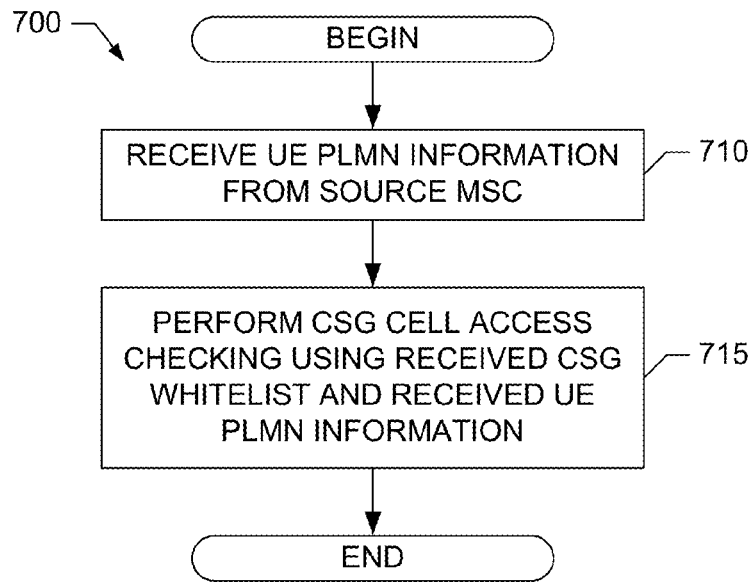
FIG. 7 is a flowchart representative of an example process that may be performed by the MSC of FIG. 3 to implement a first example approach for checking access to CSG cells as disclosed herein.

An example process 700 that may be executed to implement the example MSC 300 of FIG. 3 is illustrated in FIG. 7. The example process 700 can be used by the MSC 300 to implement the first example approach for checking access to CSG cells described above. With reference to the preceding figures and associated descriptions, the process 700 of FIG. 7 begins execution at block 710 at which the PLMN information receiver 310 of the MSC 300 receives CS domain PLMN information (e.g., the RPLMN and EPLMN list) for the mobile station 105 from the source MSC 145, as described above. At block 715, the MSC 300 then performs a CSG access check, as described above, for the mobile station 105 that includes comparing the PLMN ID of CSG cell C (120) to the CS domain PLMN information obtained at block 710.

Figure 8:
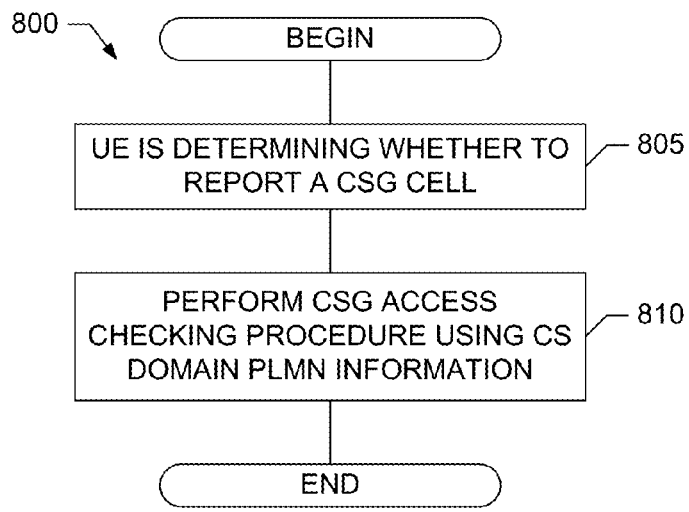
FIG. 8 is a flowchart representative of an example process that may be performed by the mobile station of FIG. 4 to implement a second example approach for checking access to CSG cells as disclosed herein.

An example process 800 that may be executed to implement the example mobile station 105 of FIGS. 1, 2 and/or 4 is illustrated in FIG. 8. The example process 800 can be used by the mobile station 105 to implement the second example approach for checking access to CSG cells described above. With reference to the preceding figures and associated descriptions, the process 800 of FIG. 8 begins execution at block 805 at which the mobile station 105 is determining whether to report the target CSG cell 120 (e.g., via a measurement report, which may cause the network to initiated a handover to the target cell 120). At block 810, the mobile station 105 uses its CS domain PLMN info 420 to perform CSG access checking using its CSG access checker 405, as described above. As described above, the CS domain PLMN info 420 corresponds to the RPLMN and EPLMN list information (e.g., List A in Table 1) obtained via a most recent CS-domain (or combined CS and PS domain) registration procedure and, thus, is consistent with the PLMN information being used by the MSC 300 to perform CSG access checking.

Figure 9:
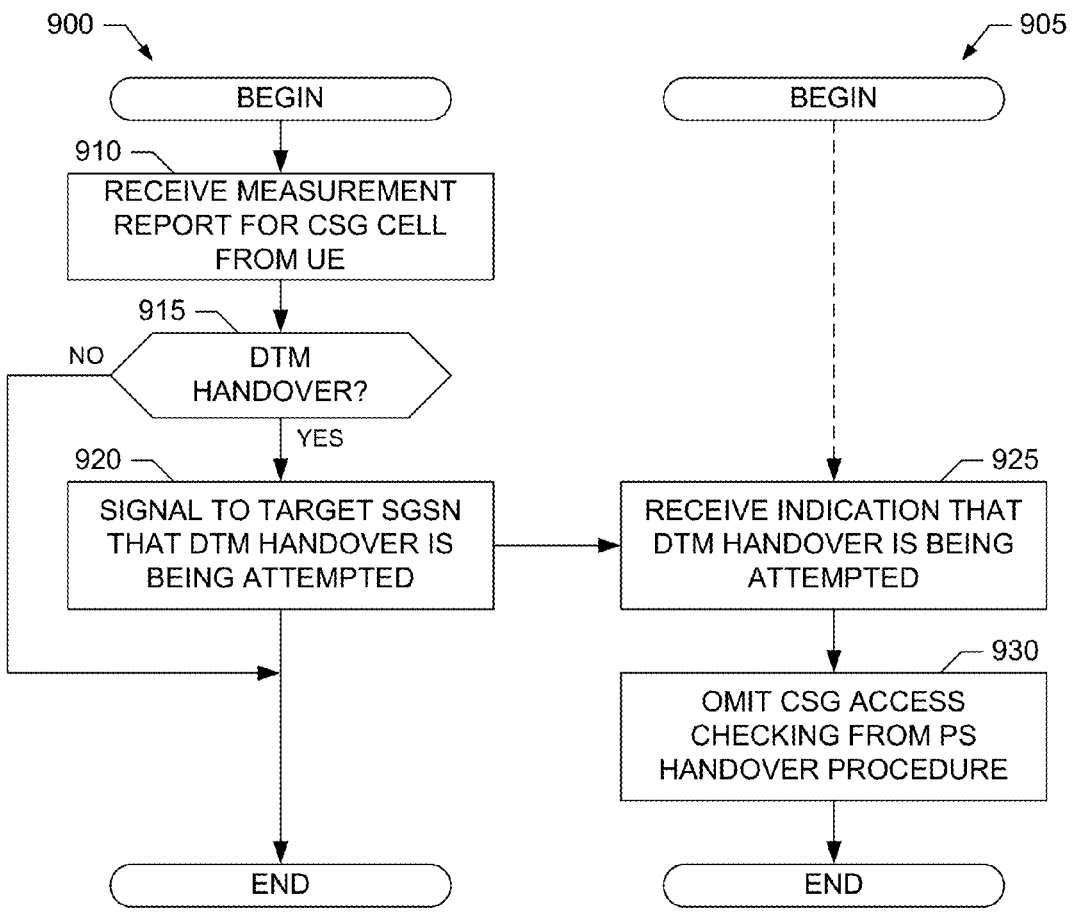
FIG. 9 is a flowchart representative of example processes that may be performed by the BSS of FIG. 5 and the SGSN of FIG. 6 to implement the second example approach for checking access to CSG cells as disclosed herein.

Respective example processes 900 and 905 that may be executed to implement the example BSS 500 of FIG. 5 and the example SGSN 600 of FIG. 6 are illustrated in FIG. 9. The example processes 900 and 905 can be used by the BSS 500 and the SGSN 600 to implement the second example approach for checking access to CSG cells described above. With reference to the preceding figures and associated descriptions, the process 900 of FIG. 9 begins execution at block 905 at which the BSS 500 receives a measurement report for the CSG cell 120 from the mobile station 105, which causes the BSS 500 to initiate a handover in the illustrated example. At block 915, the BSS 500 determines whether the handover is a DTM handover. If the handover is a DTM handover (block 915), then the handover type signaler 505 of the BSS 500 sends a message to the SGSN 600 to inform the SGSN 600 that handover being attempted by the mobile station 105 to the CSG cell 120 is a DTM handover.

Turning to the process 905 of FIG. 9, at block 925, the CSG access check controller 605 of the SGSN 600 receives the message from the BSS 500 indicating that the handover being attempted for the mobile station 105 to the CSG cell 120 is a DTM handover. Accordingly, at block 930 the CSG access check controller 605 causes the SGSN 600 to omit (e.g., disable) CSG access checking (or at least the PLMN checking portion of the CSG access check) when determining whether the PS-domain portion of the DTM handover can proceed to the target CSG cell.

Figure 10:
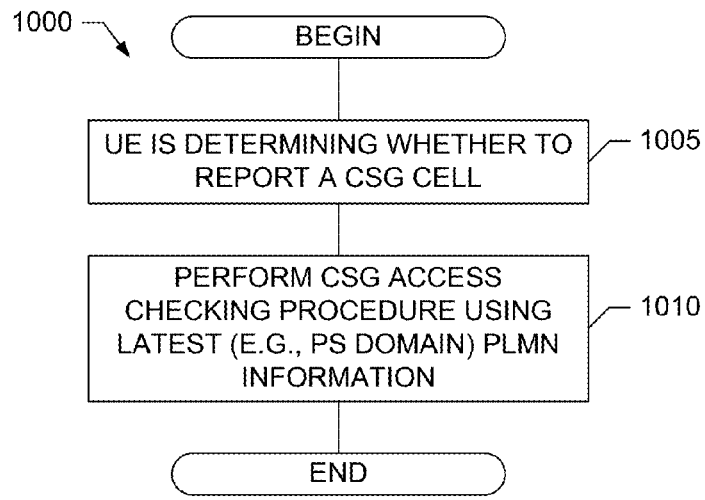
FIG. 10 is a flowchart representative of an example process that may be performed by the mobile station of FIG. 4 to implement a third example approach for checking access to CSG cells as disclosed herein.

An example process 1000 that may be executed to implement the example mobile station 105 of FIGS. 1, 2 and/or 4 is illustrated in FIG. 10. The example process 1000 can be used by the mobile station 105 to implement the third and/or fourth example approaches for checking access to CSG cells described above. With reference to the preceding figures and associated descriptions, the process 1000 of FIG. 10 begins execution at block 1005 at which the mobile station 105 is determining whether to report the target CSG cell 120 (e.g., via a measurement report, which may cause the network to initiated a handover to the target cell 120). At block 1010, the mobile station 105 uses its PS domain PLMN info 415 to perform CSG access checking using its CSG access checker 405, as described above. As described above, the PS domain PLMN info 415 corresponds to the RPLMN and EPLMN list information (e.g., List B in Table 1) obtained via a most recent PS-domain registration procedure (e.g., a routing area update procedure) and, thus, is consistent with the PLMN information being used by the SGSN 600 to perform CSG access checking as part of the PS-domain portion of the DTM handover to the target CSG cell 120.

Figure 11:
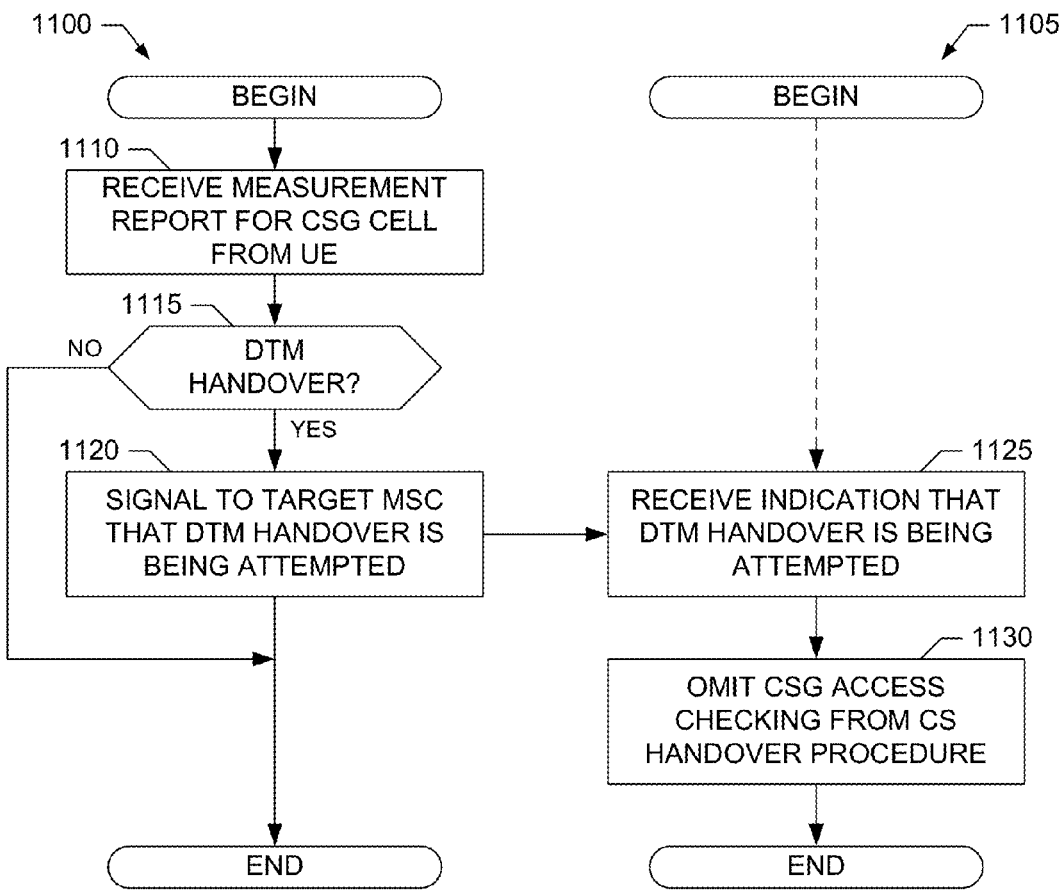
FIG. 11 is a flowchart representative of example processes that may be performed by the BSS of FIG. 5 and the MSC of FIG. 3 to implement the third example approach for checking access to CSG cells as disclosed herein.

Respective example processes 1100 and 1105 that may be executed to implement the example BSS 500 of FIG. 5 and the example MSC 300 of FIG. 3 are illustrated in FIG. 11. The example processes 1100 and 1105 can be used by the BSS 500 and the MSC 300 to implement the third example approach for checking access to CSG cells described above. With reference to the preceding figures and associated descriptions, the process 1100 of FIG. 11 begins execution at block 1105 at which the BSS 500 receives a measurement report for the CSG cell 120 from the mobile station 105, which causes the BSS 500 to initiate a handover in the illustrated example. At block 1115, the BSS 500 determines whether the handover is a DTM handover. If the handover is a DTM handover (block 1115), then the handover type signaler 505 of the BSS 500 sends a message to the MSC 300 to inform the MSC 300 that handover being attempted by the mobile station 105 to the CSG cell 120 is a DTM handover.

Turning to the process 1105 of FIG. 11, at block 1125, the CSG access check controller 315 of the MSC 300 receives the message from the BSS 500 indicating that the handover being attempted by the mobile station 105 to the CSG cell 120 is a DTM handover. Accordingly, at block 1130 the CSG access check controller 605 causes the MSC 300 to omit (e.g., disable) CSG access checking when determining whether the CS-domain portion of the DTM handover can proceed to the target CSG cell.

Figure 12:
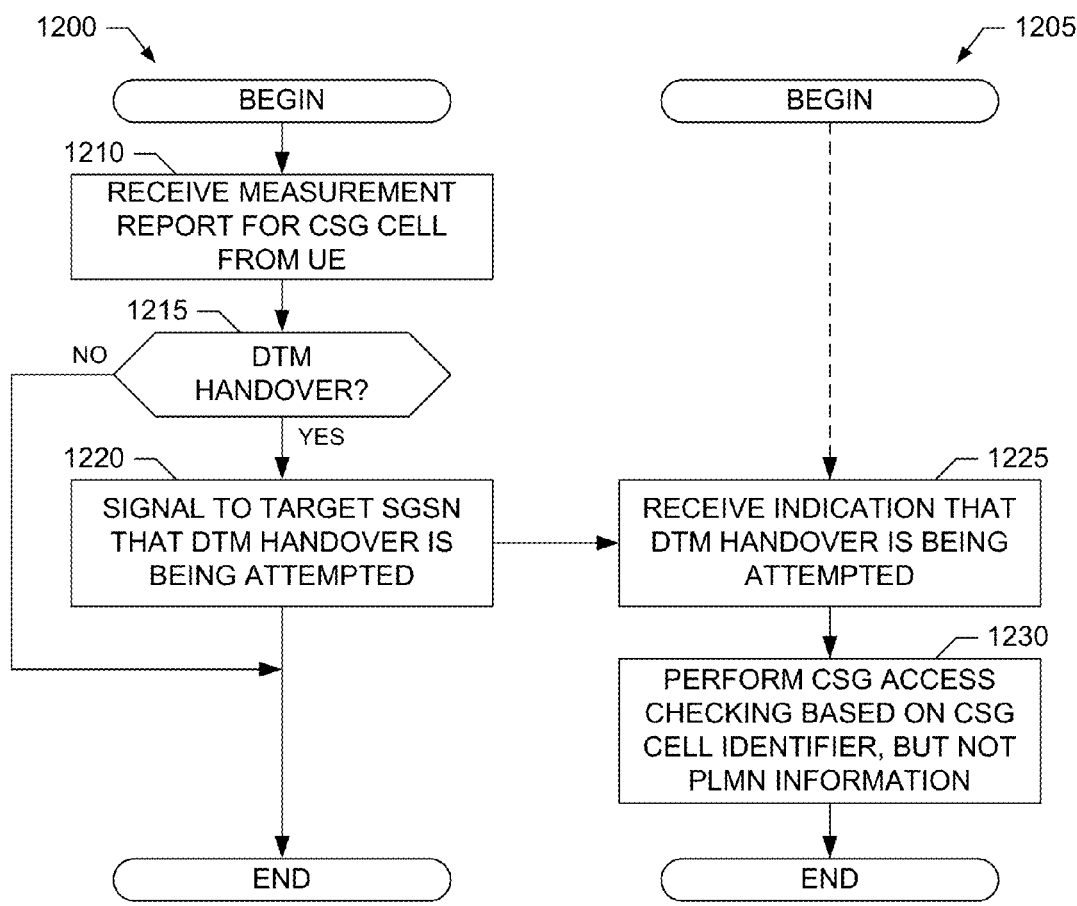
FIG. 12 is a flowchart representative of example processes that may be performed by the BSS of FIG. 5 and the MSC of FIG. 3 to implement a fourth example approach for checking access to CSG cells as disclosed herein.

Respective example processes 1200 and 1205 that may be executed to implement the example BSS 500 of FIG. 5 and the example MSC 300 of FIG. 3 are illustrated in FIG. 12. The example processes 1200 and 1205 can be used by the BSS 500 and the MSC 300 to implement the fourth example approach for checking access to CSG cells described above. With reference to the preceding figures and associated descriptions, the process 1200 of FIG. 12 begins execution at block 1205 at which the BSS 500 receives a measurement report for the CSG cell 120 from the mobile station 105, which causes the BSS 500 to initiate a handover in the illustrated example. At block 1215, the BSS 500 determines whether the handover is a DTM handover. If the handover is a DTM handover (block 1215), then the handover type signaler 505 of the BSS 500 sends a message to the MSC 300 to inform the MSC 300 that handover being attempted by the mobile station 105 to the CSG cell 120 is a DTM handover.

Turning to the process 1205 of FIG. 12, at block 1225, the CSG access check controller 315 of the MSC 300 receives the message from the BSS 500 indicating that the handover being attempted by the mobile station 105 to the CSG cell 120 is a DTM handover. Accordingly, at block 1230 the CSG access check controller 605 causes the MSC 300 to perform CSG access checking for the mobile station 105 by comparing the CSG ID of the CSG cell 120 to the mobile station's CSG whitelist, but causes the MSC 300 to omit (e.g., disable) the portion of the CSG access check involving comparing the PLMN ID of the CSG cell 120 with the PLMN information (e.g., the RPLMN and EPLMN list) associated with the mobile station 105.

Figure 13:
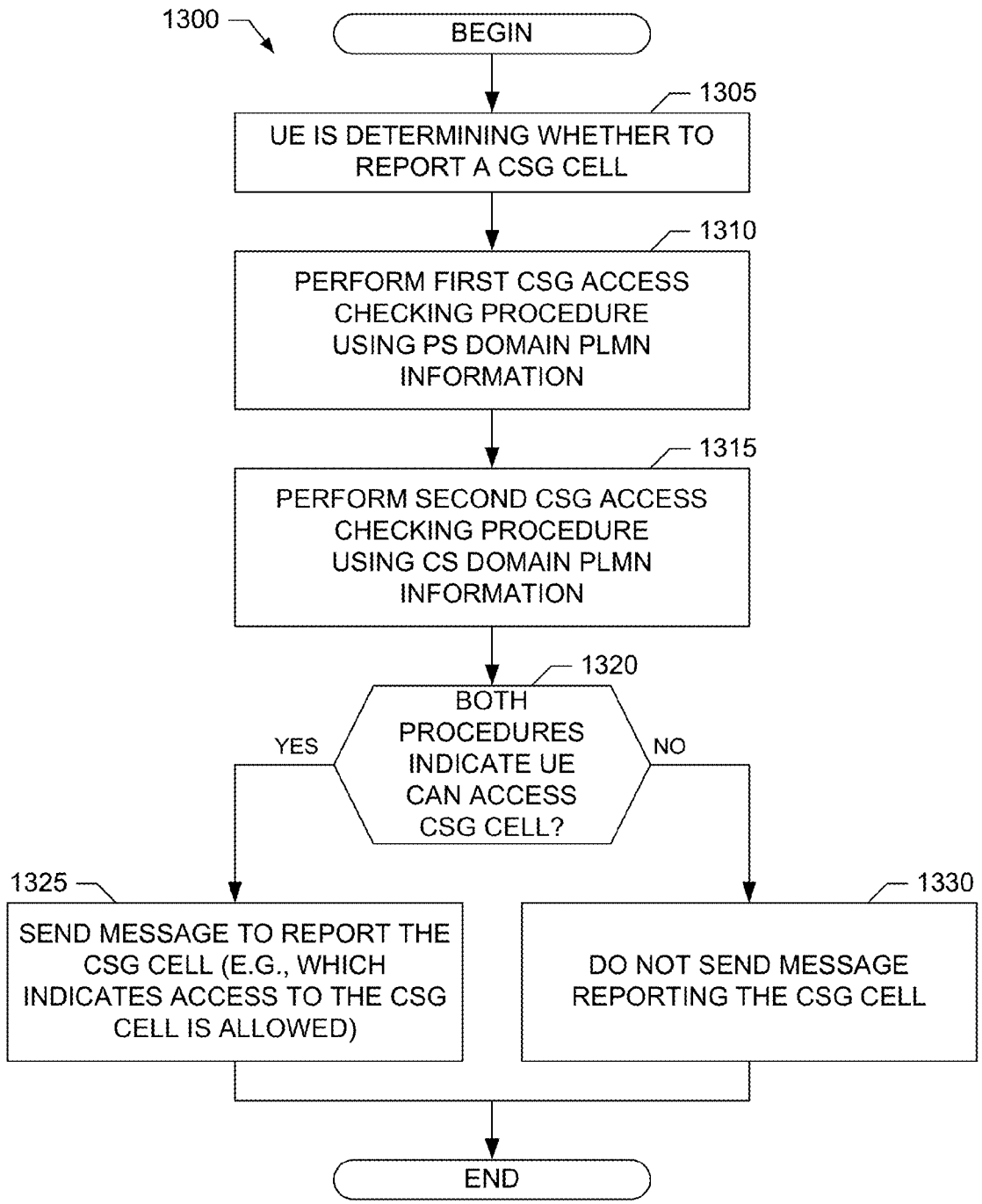
FIG. 13 is a flowchart representative of an example process that may be performed by the mobile station of FIG. 4 to implement a fifth example approach for checking access to CSG cells as disclosed herein.

An example process 1300 that may be executed to implement the example mobile station 105 of FIGS. 1, 2 and/or 4 is illustrated in FIG. 13. The example process 1300 can be used by the mobile station 105 to implement the fifth example approach and/or the third example implementation of the sixth example approach for checking access to CSG cells described above. With reference to the preceding figures and associated descriptions, the process 1300 of FIG. 13 begins execution at block 1305 at which the mobile station 105 is determining whether to report the target CSG cell 120 (e.g., via a measurement report, which may cause the network to initiated a handover to the target cell 120). At block 1310, the mobile station 105 uses its PS domain PLMN info 415 to perform a first CSG access check with its CSG access checker 405, as described above. As described above, the PS domain PLMN info 415 corresponds to the RPLMN and EPLMN list information (e.g., List B in Table 1) obtained via a most recent PS-domain registration procedure (e.g., a routing area update procedure) and, thus, is consistent with the PLMN information being used by the SGSN 600 to perform CSG access checking as part of the PS-domain portion of the DTM handover to the target CSG cell 120. At block 1315, the mobile station 105 uses its CS domain PLMN info 420 to perform a second CSG access check with its CSG access checker 405, as described above. As described above, the CS domain PLMN info 420 corresponds to the RPLMN and EPLMN list information (e.g., List A in Table 1) obtained via a most recent CS-domain registration procedure (e.g., a location update procedure) and, thus, is consistent with the PLMN information being used by the MSC 300 to perform CSG access checking as part of the CS-domain portion of the DTM handover to the target CSG cell 120.

At block 1320, the access check identifier 425 of the mobile station 105 determines whether both of the CSG access checks performed at blocks 1310 and 1315 succeeded and, thus, indicate that the mobile station can access the target CSG cell 120. If both CSG access checks succeeded (block 1320), then at block 1325 the mobile station 105 sends a message (e.g., a measurement report for the target CSG cell 120) via its message transceiver 430 to the BSS 500, which indicates that access to the target CSG cell 120 is allowed and, thus, may cause handover to the CSG cell 120 to be initiated. Conversely, if one or both of the CSG access checks failed (block 1320), at block 1330 the mobile stations 105 does not send the message (e.g., the measurement report for the target CSG cell 120) to the BSS 500 and, thus, handover is not initiated.

Figure 14:
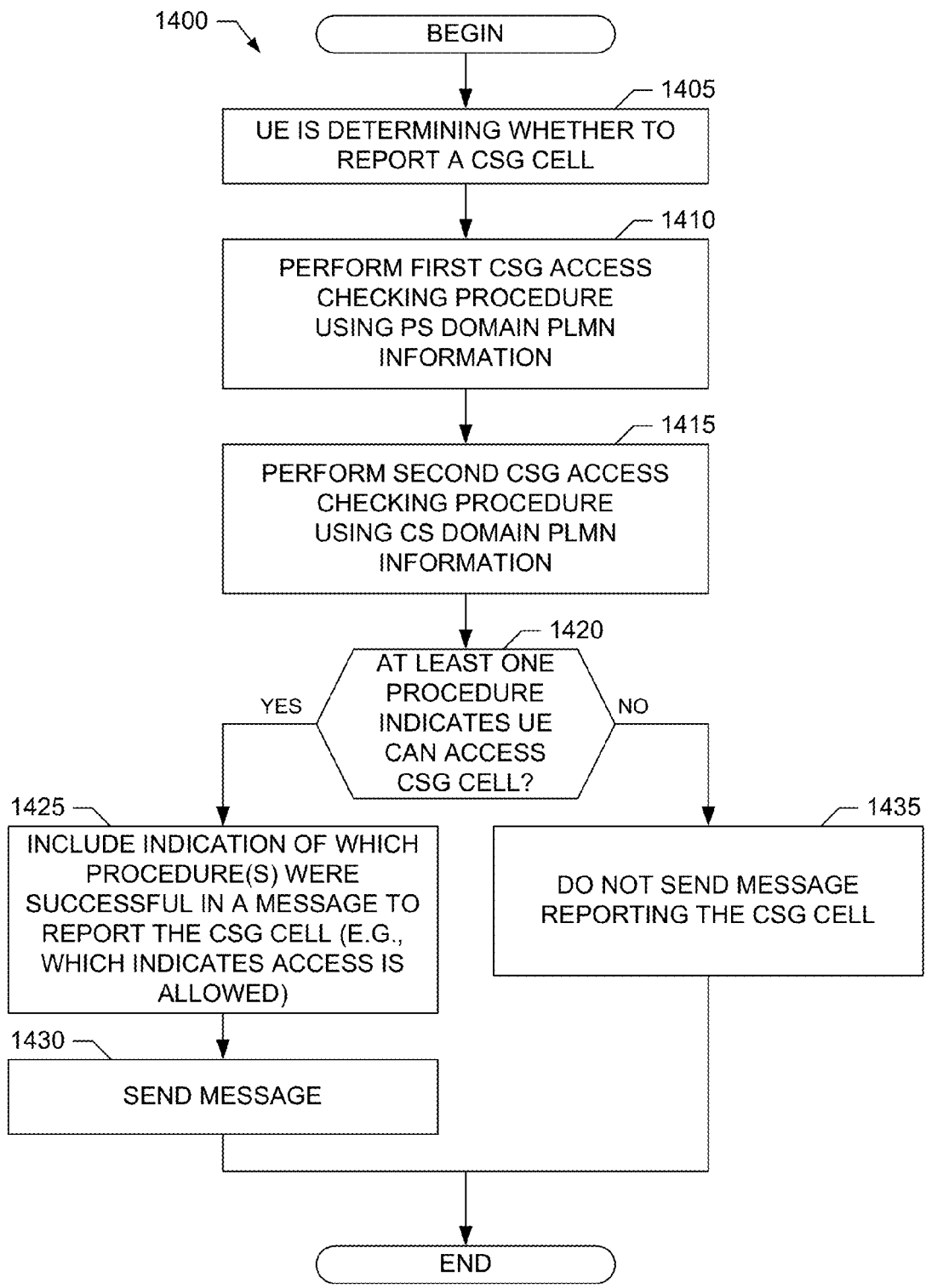
FIG. 14 is a flowchart representative of an example process that may be performed by the mobile station of FIG. 4 to implement a sixth example approach for checking access to CSG cells as disclosed herein.

An example process 1400 that may be executed to implement the example mobile station 105 of FIGS. 1, 2 and/or 4 is illustrated in FIG. 14. The example process 1400 can be used by the mobile station 105 to implement the second example implementation of the sixth example approach for checking access to CSG cells described above. With reference to the preceding figures and associated descriptions, the process 1400 of FIG. 14 begins execution at block 1405 at which the mobile station 105 is determining whether to report the target CSG cell 120. At block 1410, the mobile station 105 uses its PS domain PLMN info 415 to perform a first CSG access check with its CSG access checker 405, as described above. As described above, the PS domain PLMN info 415 corresponds to the RPLMN and EPLMN list information (e.g., List B in Table 1) obtained via a most recent PS-domain registration procedure (e.g., a routing area update procedure) and, thus, is consistent with the PLMN information being used by the SGSN 600 to perform CSG access checking as part of the PS-domain portion of the DTM handover to the target CSG cell 120. At block 1415, the mobile station 105 uses its CS domain PLMN info 420 to perform a second CSG access check with its CSG access checker 405, as described above. As described above, the CS domain PLMN info 420 corresponds to the RPLMN and EPLMN list information (e.g., List A in Table 1) obtained via a most recent CS-domain registration procedure (e.g., a location update procedure) and, thus, is consistent with the PLMN information being used by the MSC 300 to perform CSG access checking as part of the CS-domain portion of the DTM handover to the target CSG cell 120.

At block 1420, the access check identifier 425 of the mobile station 105 determines whether at least one of the CSG access checks performed at blocks 1310 and 1315 succeeded and, thus, indicates that the mobile station can access the target CSG cell 120. If at least one of the CSG access checks succeeded (block 1420), then at block 1425 the mobile station 105 prepares a message (e.g., a measurement report for the target CSG cell 120) to be sent to the BSS 500, which indicates that access to the target CSG cell 120 is allowed and, thus, may cause handover to the CSG cell 120 to be initiated. The message prepared at block 1425 also includes an indication of which of the CSG access checks at blocks 1310 and 1315 succeeded or, in other words, whether the first CSG access check based on the PS domain PLMN info 415, the second CSG access check based on the CS domain PLMN info 420, or both, succeeded. At block 1430, the mobile station 105 sends, via its message transceiver 430, the message (e.g., the measurement report for the target CSG cell 120) prepared at block 1425 to the BSS 500, which indicates which CSG access check determined that access to the target CSG cell 120 is allowed. Conversely, if both of the CSG access checks failed (block 1420), at block 1435 the mobile stations 105 does not send the message (e.g., the measurement report for the target CSG cell 120) to the BSS 500 and, thus, handover is not initiated.

The mobile station 105 can support the first example implementation of the sixth example approach for checking access to CSG cells described above via a modification of the example process 1400. In particular, instead of performing the two CSG access checks at block 1410 and 1415, the mobile station 105 selects to perform either the first CSG access check based on the PS domain PLMN info 415 or the second CSG access check based on the CS domain PLMN info 420. If the selected check passes (e.g., see block 1420), then at block 1425 the mobile station 105 includes in the message an indication of which CSG access check was selected and successful. Operation of the example process 1400 otherwise proceeds as described above.

Figure 15:
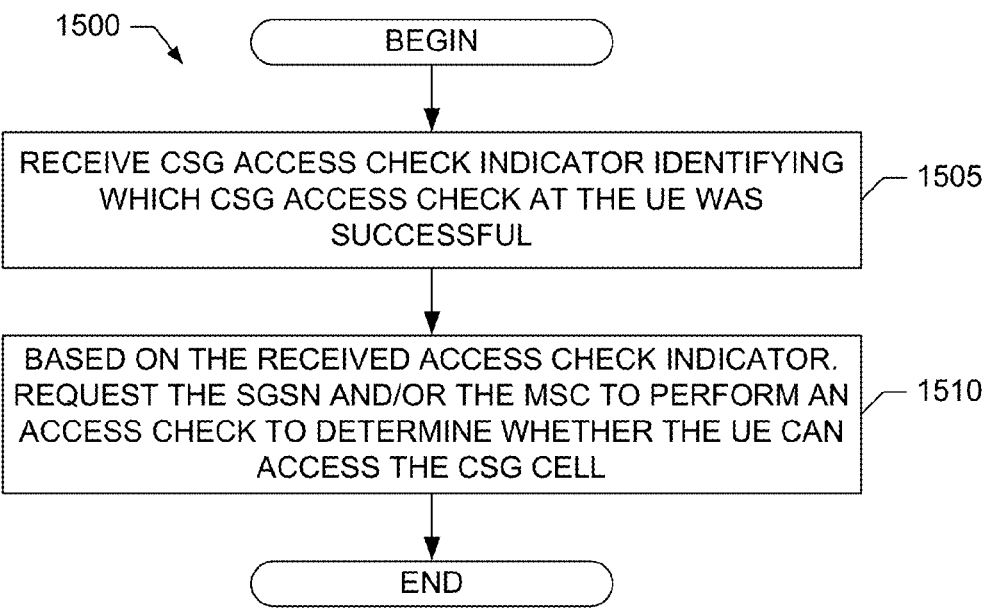
FIG. 15 is a flowchart representative of an example process that may be performed by the BSS of FIG. 5 to implement the sixth example approach for checking access to CSG cells as disclosed herein.

An example process 1500 that may be executed to implement the example BSS 500 of FIG. 5 is illustrated in FIG. 15. The example process 1500 can be used by the BSS 500 to implement the sixth example approach for checking access to CSG cells described above. With reference to the preceding figures and associated descriptions, the process 1500 of FIG. 15 begins execution at block 1505 at which the access check selector 510 of the BSS 500 receives a message (e.g., a measurement report) from the mobile station 105 containing an indicator identifying which of a first CSG access check based on the PS domain PLMN info 415 or a second CSG access check based on the CS domain PLMN info 420 (or both) was successful and, thus, indicate that the mobile station 105 can access the target CSG cell 120. At block 1510, the access check selector 510 of the BSS 500 then requests that the serving SGSN 160 perform the CSG access check (e.g., if the mobile station 105 reports that the first CSG access check was performed) or requests that the serving MSC 150 perform the CSG access check (e.g., if the mobile station 105 reports that the second check was performed), or both, in accordance with the indicator received at block 1505. The BSS 500 then uses the requested CN-side CSG access check result(s) when determining whether to initiate the handover to the target CSG cell 120.

Figure 16:
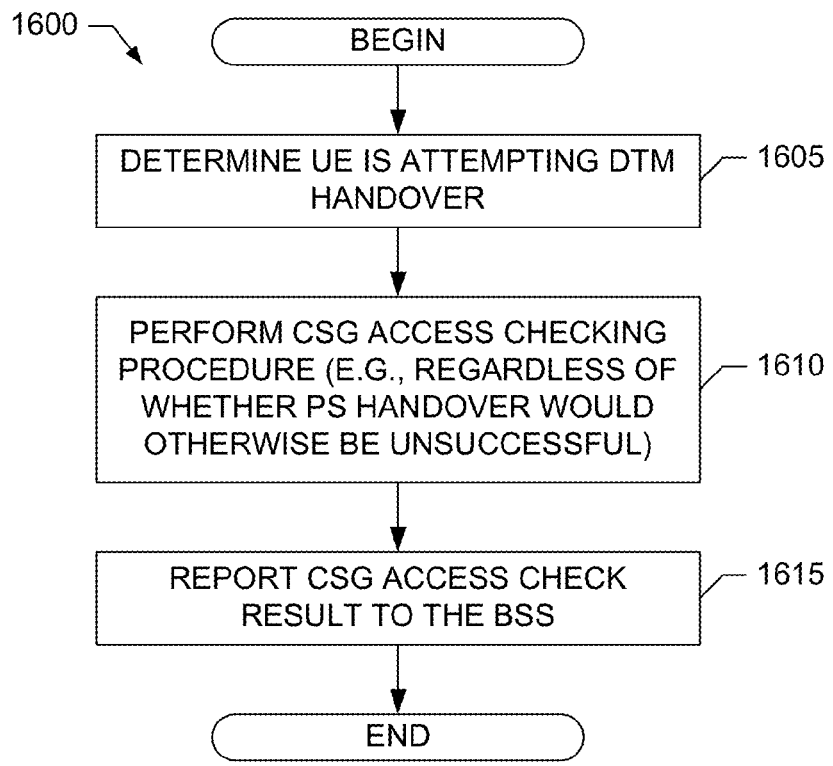
FIG. 16 is a flowchart representative of an example process that may be performed by the SGSN of FIG. 6 to implement a seventh example approach for checking access to CSG cells as disclosed herein.

An example process 1600 that may be executed to implement the example SGSN 600 of FIG. 6 is illustrated in FIG. 16. The example process 1600 can be used by the SGSN 600 to implement the seventh example approach for checking access to CSG cells described above. With reference to the preceding figures and associated descriptions, the process 1600 of FIG. 16 begins execution at block 1605 at which the SGSN 600 determines that the mobile station 105 is attempting a DTM handover to the target CSG cell 120. For example, at block 1605 the SGSN 600 may receive a message, such as a PS-HANDOVER-REQUIRED PDU, from the BSS 500 containing a new IE indicating that the handover is a DTM handover. At block 1610, the SGSN 600 performs a CSG access check, as described above, to determine whether the mobile station 105 is able to access the target CSG cell 120. As described above, the SGSN 600 performs the CSG access check at block 1610 regardless of whether the PS handover portion of the DTM handover would otherwise be successful or unsuccessful. At block 1615, the access check result reporter 610 of the SGSN 600 reports the results of its CSG access check to the BSS 500, as described above.

Figure 17:
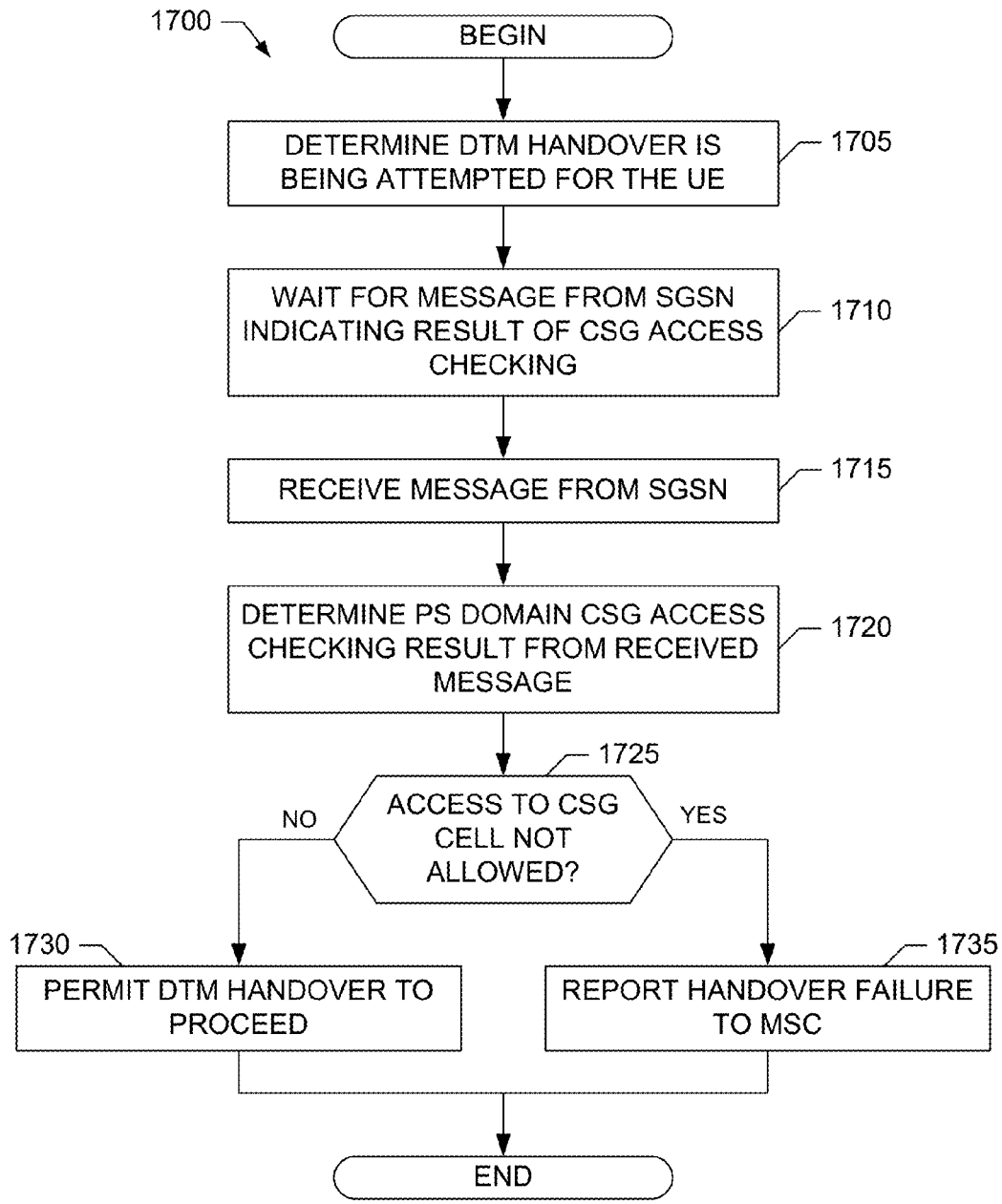
FIG. 17 is a flowchart representative of an example process that may be performed by the BSS of FIG. 5 to implement the seventh example approach for checking access to CSG cells as disclosed herein.

An example process 1700 that may be executed to implement the example BSS 500 of FIG. 5 is illustrated in FIG. 17. The example process 1700 can be used by the BSS 500 to implement the seventh example approach for checking access to CSG cells described above. With reference to the preceding figures and associated descriptions, the process 1700 of FIG. 17 begins execution at block 1705 at which the BSS 500 determines that a DTM handover to the target CSG cell 120 is being attempted a for the mobile station 105. At block 1710, the BSS 500 waits for a message from the SGSN 600 providing a CSG access check result indicating whether the mobile station 105 is able to access the target CSG cell 120. At block 1715, the BSS 500 receives the message containing the CSG access check result from the SGSN 600. At block 1720, the PS domain access check processor 515 of the BSS 500 processes the received message to determine the PS domain CSG access check result returned from the SGSN 600. For example, at block 1720, the PS domain access check processor 515 can decode the received message in accordance with which of the example alternatives described above was used to indicate the CSG access result in the message.

At block 1725, the BSS 500 determines whether the received PS domain access check result indicates that the mobile station 105 is allowed to access the target CSG cell 120. If the mobile station 105 is allowed to access the CSG cell 120 (block 1725), then at block 1730 the BSS 500 permits the DTM handover to the target CSG cell 120 to proceed (e.g., regardless of any CS domain CSG access check result received from the MSC 300). Conversely, if the mobile station 105 is not allowed to access the CSG cell 120 (block 1725), then at block 1735 the BSS 500 does not permit either a DTM handover or a CS-only handover to the target CSG cell 120 to occur (e.g., regardless of any CS domain CSG access check result received from the MSC 300). Furthermore, at block 1735, the BSS reports the handover failure to the MSC 300.

Figure 18:
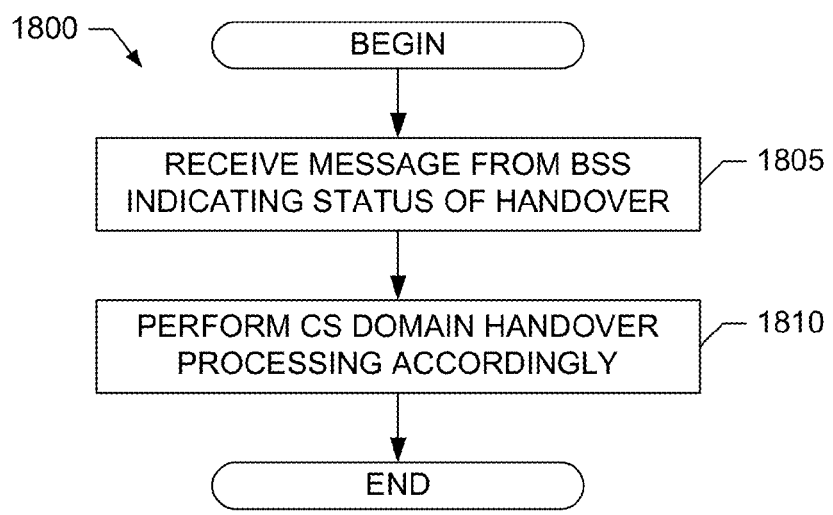
FIG. 18 is a flowchart representative of an example process that may be performed by the MSC of FIG. 3 to implement the seventh example approach for checking access to CSG cells as disclosed herein.

An example process 1800 that may be executed to implement the example MSC 300 of FIG. 3 is illustrated in FIG. 18. The example process 1800 can be used by the MSC 300 to implement the seventh example approach for checking access to CSG cells described above. With reference to the preceding figures and associated descriptions, the process 1800 of FIG. 18 begins execution at block 1805 at which the handover status receiver 320 of the MSC 300 receives a message from the BSS 500 indicating the status of a DTM handover being attempted by the mobile station 105 to the target CSG cell 120. At block 1810, the MSC 300 performs the CS domain portion of the DTM handover in accordance with the message received at block 1805. For example, if the message from the BSS 500 indicates that the DTM handover has failed (e.g., because the PS domain CSG access check result from the SGSN 500 indicates a failure), then the MSC 300 will not proceed with the CS domain portion of the DTM handover.

Figure 19:
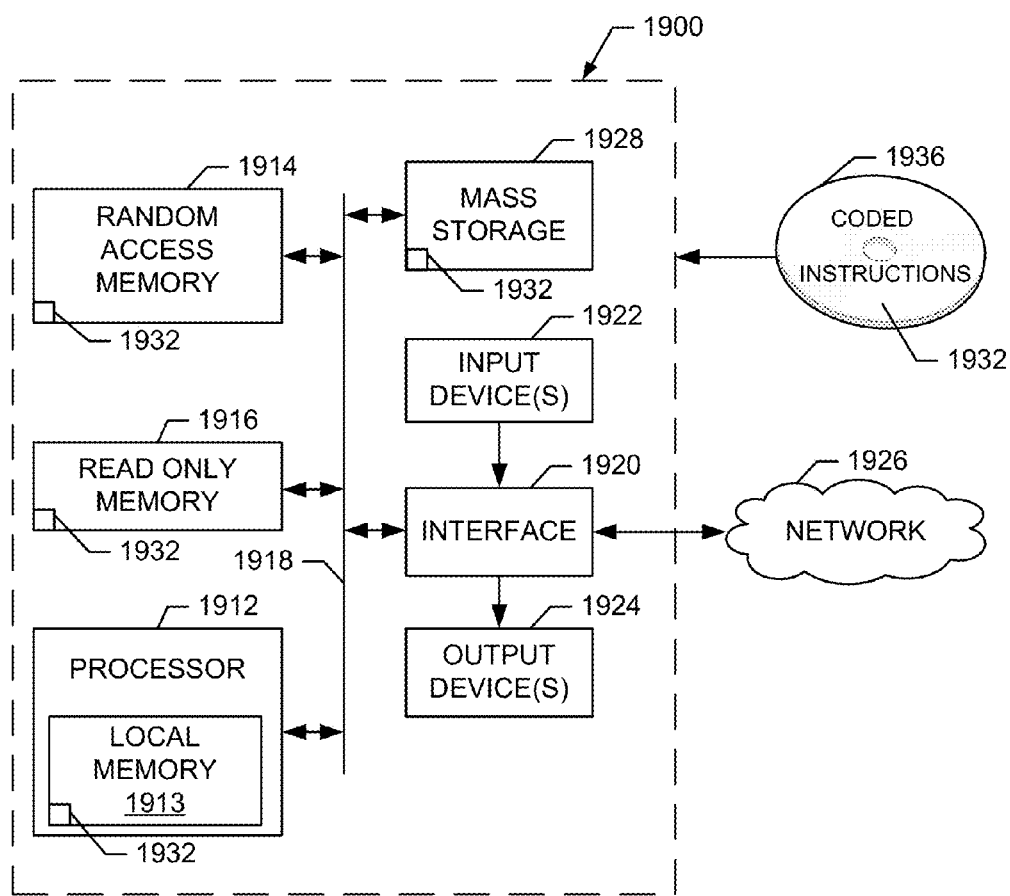
FIG. 19 is a block diagram of an example processing system that may execute example machine readable instructions used to implement some or all of the processes of FIGS. 7-17 and/or 18 to implement the MSC of FIG. 3, the mobile station of FIG. 4, the BSS of FIG. 5, the SGSN of FIG. 6 and/or the mobile network of FIG. 1.

FIG. 19 is a block diagram of an example processing system 1900 capable of executing the processes of FIGS. 7-18 to implement the example mobile network 100, the example mobile device 105, the example BSSs 135, 140 and/or 500, the example MSCs 145, 150 and/or 300, the example SGSNs. 155, 160 and/or 600, the example CSG whitelist receiver 305, the example PLMN information receiver 310, the example CSG access check controller 315, the example handover status receiver 320, the example CSG access checker 405, the example access check identifier 425, the example message transceiver 430, the example handover type signaler 505, the example access check selector 510, the example PS domain access check processor 515, the example CSG access check controller 605, and/or the example access check result reporter 610 of FIGS. 1-6. The processing system 1900 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1900 of the instant example includes a processor 1912. For example, the processor 1912 can be implemented by one or more microprocessors and/or controllers from any desired family or manufacturer.

The processor 1912 includes a local memory 1913 (e.g., a cache) and is in communication with a main memory including a volatile memory 1914 and a non-volatile memory 1916 via a bus 1918. The volatile memory 1914 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processing system 1900 also includes an interface circuit 1920. The interface circuit 1920 may be implemented by any type of interface standard, such as an Ethernet interface, a universal serial bus (USB), and/or a PCI express interface.

One or more input devices 1922 are connected to the interface circuit 1920. The input device(s) 1922 permit a user to enter data and commands into the processor 1912. The input device(s) can be implemented by, for example, a keyboard, a mouse, a touchscreen, a track-pad, a trackball, a trackbar (such as an isopoint), a voice recognition system and/or any other human-machine interface.

One or more output devices 1924 are also connected to the interface circuit 1920. The output devices 1924 can be implemented, for example, by display devices (e.g., a liquid crystal display, a cathode ray tube display (CRT)), a printer and/or speakers. The interface circuit 1920, thus, typically includes a graphics driver card.

The interface circuit 1920 also includes a communication device, such as a modem or network interface card, to facilitate exchange of data with external computers via a network 1926 (e.g., an Ethernet connection, a digital subscriber line (DSL), a telephone line, coaxial cable, a cellular telephone system, etc.).

The processing system 1900 also includes one or more mass storage devices 1928 for storing machine readable instructions and data. Examples of such mass storage devices 1928 include floppy disk drives, hard drive disks, compact disk drives and digital versatile disk (DVD) drives.

Coded instructions 1932 corresponding to the instructions of FIGS. 7-18 may be stored in the mass storage device 1928, in the volatile memory 1914, in the non-volatile memory 1916, in the local memory 1913 and/or on a removable storage medium, such as a CD or DVD 1936.

As an alternative to implementing the methods and/or apparatus described herein in a system such as the processing system of FIG. 19, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for a mobile station, the method comprising:
   storing a second equivalent public land mobile network (EPLMN) list and a second RPLMN identifier before obtaining a first EPLMN list and a first registered public land mobile network (RPLMN) identifier via a subsequent packet switched domain registration procedure;
   performing a first access check based on the first EPLMN list and the first RPLMN identifier to determine whether the mobile station is allowed to access a closed subscriber group (CSG) cell;
   performing a second access check based on a second EPLMN list and a second RPLMN identifier to determine whether the mobile station is allowed to access the CSG cell, wherein the second EPLMN list and the second RPLMN identifier respectively comprise an EPLMN list and an RPLMN identifier obtained via a most recent circuit switched domain registration procedure, and the second access check comprises comparing a PLMN identifier associated with the CSG cell with the second EPLMN list and the second RPLMN identifier; and
   conditioning reporting of the CSG cell based on the first access check and the second access check.

2. A method as defined in claim 1 wherein the first EPLMN list and the first RPLMN identifier respectively comprise an EPLMN list and an RPLMN identifier obtained via a most recent packet switched domain registration procedure, and the first access check comprises comparing a public land mobile network (PLMN) identifier associated with the CSG cell with the first EPLMN list and the first RPLMN identifier.

3. A method as defined in claim 1 wherein conditioning the reporting of the CSG cell based on the first access check and the second access check comprises:
   reporting the CSG cell if at least one of the first access check indicates that the mobile station is allowed to access the CSG cell or the second access check indicates that the mobile station is allowed to access the CSG cell; and
   not reporting the CSG cell if the first access check indicates that the mobile station is not allowed to access the CSG cell and the second access check indicates that the mobile station is not allowed to access the CSG cell.

4. A method as defined in claim 3 further comprising sending information to identify which of the first access check and the second access check indicated that the mobile station is allowed to access the CSG cell.

5. A method as defined in claim 1 wherein conditioning the reporting of the CSG cell based on the first access check and the second access check comprises:
   reporting the CSG cell if the first access check indicates that the mobile station is allowed to access the CSG cell and the second access check indicates that the mobile station is allowed to access the CSG cell; and
   not reporting the CSG cell if at least one of the first access check indicates that the mobile station is not allowed to access the CSG cell or the second access check indicates that the mobile station is not allowed to access the CSG cell.

6. A non-transitory machine readable storage medium comprising machine readable instructions which, when executed, cause a machine to perform the method defined in claim 1.

7. A mobile station comprising: memory to store machine readable instructions; and a processor to execute the machine readable instructions to:
   store a second equivalent public land mobile network (EPLMN) list and a second RPLMN identifier before obtaining a first EPLMN list and a first registered public land mobile network (RPLMN) identifier via a subsequent packet switched domain registration procedure;
   perform a first access check based on the first EPLMN list and the first RPLMN identifier to determine whether the mobile station is allowed to access a closed subscriber group (CSG) cell;
   perform a second access check based on a second EPLMN list and a second RPLMN identifier to determine whether the mobile station is allowed to access the CSG cell, wherein the second EPLMN list and the second RPLMN identifier respectively comprise an EPLMN list and an RPLMN identifier obtained via a most recent circuit switched domain registration procedure, and the second access check comprises comparing a PLMN identifier associated with the CSG cell with the second EPLMN list and the second RPLMN identifier; and
   condition reporting of the CSG cell based on the first access check and the second access check.

8. A mobile station as defined in claim 7 wherein the first EPLMN list and the first RPLMN identifier respectively comprise an EPLMN list and an RPLMN identifier obtained via a most recent packet switched domain registration procedure, and to perform the first access check, the processor is to compare a public land mobile network (PLMN) identifier associated with the CSG cell with the first EPLMN list and the first RPLMN identifier.

9. A mobile station as defined in claim 7 wherein the processor further is to:
   report the CSG cell if at least one of the first access check indicates that the mobile station is allowed to access the CSG cell or the second access check indicates that the mobile station is allowed to access the CSG cell; and
   not report the CSG cell if the first access check indicates that the mobile station is not allowed to access the CSG cell and the second access check indicates that the mobile station is not allowed to access the CSG cell.

10. A mobile station as defined in claim 9 wherein the processor further is to send information to identify which of the first access check and the second access check indicated that the mobile station is allowed to access the CSG cell.

11. A mobile station as defined in claim 7 wherein the processor further is to:
   report the CSG cell if the first access check indicates that the mobile station is allowed to access the CSG cell and the second access check indicates that the mobile station is allowed to access the CSG cell; and
   not report the CSG cell if at least one of the first access check indicates that the mobile station is not allowed to access the CSG cell or the second access check indicates that the mobile station is not allowed to access the CSG cell.

* * * * *